US012159380B2

(12) United States Patent
Barnes et al.

(10) Patent No.: US 12,159,380 B2
(45) Date of Patent: Dec. 3, 2024

(54) GENERATING MODIFIED DIGITAL IMAGES VIA IMAGE INPAINTING USING MULTI-GUIDED PATCH MATCH AND INTELLIGENT CURATION

(71) Applicant: Adobe Inc., San Jose, CA (US)

(72) Inventors: Connelly Barnes, Seattle, WA (US); Elya Shechtman, Seattle, WA (US); Sohrab Amirghodsi, Seattle, WA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 363 days.

(21) Appl. No.: 17/664,991

(22) Filed: May 25, 2022

(65) Prior Publication Data

US 2023/0385992 A1    Nov. 30, 2023

(51) Int. Cl.
*G06K 9/00* (2022.01)
*G06T 5/50* (2006.01)
*G06T 5/77* (2024.01)

(52) U.S. Cl.
CPC ............ *G06T 5/77* (2024.01); *G06T 5/50* (2013.01); *G06T 2207/10024* (2013.01); *G06T 2207/20084* (2013.01); *G06T 2207/20212* (2013.01)

(58) Field of Classification Search
CPC ... G06T 5/77; G06T 5/50; G06T 2207/10024; G06T 2207/20084; G06T 2207/20212
See application file for complete search history.

(56) References Cited

U.S. PATENT DOCUMENTS

| 10,997,752 B1* | 5/2021 | Yoo ............... G06T 11/00 |
| 2011/0044514 A1* | 2/2011 | Rahmes ............ G06V 40/1347 382/124 |
| 2012/0247890 A1* | 10/2012 | Murakami ............ F16F 9/062 188/282.1 |

(Continued)

FOREIGN PATENT DOCUMENTS

WO   WO-2010013171 A1 *   2/2010   ............ G06T 5/005

OTHER PUBLICATIONS

Image inpainting based on deep learning: A review, Zhen Qin et al., Elsevier, 2012, pp. 1-14 (Year: 2012).*

(Continued)

*Primary Examiner* — Jayesh A Patel
(74) *Attorney, Agent, or Firm* — Keller Preece PLLC

(57) ABSTRACT

The present disclosure relates to systems, methods, and non-transitory computer readable media that implement an inpainting framework having computer-implemented machine learning models to generate high-resolution inpainting results. For instance, in one or more embodiments, the disclosed systems generate an inpainted digital image utilizing a deep inpainting neural network from a digital image having a replacement region. The disclosed systems further generate, utilizing a visual guide algorithm, at least one deep visual guide from the inpainted digital image. Using a patch match model and the at least one deep visual guide, the disclosed systems generate a plurality of modified digital images from the digital image by replacing the region of pixels of the digital image with replacement pixels. Additionally, the disclosed systems select, utilizing an inpainting curation model, a modified digital image from the plurality of modified digital images to provide to a client device.

20 Claims, 12 Drawing Sheets

(56) References Cited

U.S. PATENT DOCUMENTS

| | | | | |
|---|---|---|---|---|
| 2015/0086112 | A1* | 3/2015 | Tian | G06V 10/26 |
| | | | | 382/173 |
| 2018/0129899 | A1* | 5/2018 | Harron | G06N 3/044 |
| 2020/0098095 | A1* | 3/2020 | Borcs | G06V 10/454 |
| 2020/0226714 | A1* | 7/2020 | Duan | G06T 5/77 |
| 2021/0004940 | A1* | 1/2021 | Qin | G06T 5/20 |
| 2021/0150676 | A1* | 5/2021 | Sytnik | G06T 5/73 |
| 2021/0295477 | A1* | 9/2021 | Zhai | G06T 7/0002 |
| 2021/0303849 | A1* | 9/2021 | Dubroy | G06T 17/05 |
| 2021/0374905 | A1* | 12/2021 | Duan | G06F 3/04842 |
| 2021/0407163 | A1* | 12/2021 | Chai | G06N 3/045 |
| 2022/0148241 | A1* | 5/2022 | Park | G06T 5/60 |
| 2022/0292650 | A1* | 9/2022 | Amirghodsi | G06N 3/096 |
| 2023/0005107 | A1* | 1/2023 | Gopalkrishna | G06T 7/194 |
| 2023/0005108 | A1* | 1/2023 | Gopalkrishna | H04N 5/2723 |
| 2023/0144724 | A1* | 5/2023 | Major | G06T 7/0012 |
| | | | | 382/128 |
| 2023/0214252 | A1* | 7/2023 | Irizarry | G06F 9/451 |
| | | | | 718/102 |
| 2023/0237630 | A1* | 7/2023 | Zhu | G06V 10/776 |
| 2024/0127452 | A1* | 4/2024 | Lin | G06V 20/70 |

OTHER PUBLICATIONS

Damaged region filling by improved criminisi image inpainting algorithm for thangka, Fan Yao, Springer, 2019, pp. S13863-S13691 (Year: 2019).*

Image Inpainting: A Review, Omar Elharrouss et al., Springer, 2019, pp. 2007-2028, May 20, 2022, Wiley, pp. 1-27 (Year: 2022).*

Overview of Image Inpainting and Forensic Technology, Kai Liu et al., Wiley, May 20, 2022, pp. 1-27 (Year: 2022).*

R-MNet: A Perceptual Adversarial Network for Image Inpainting, Jireh Jam et al., 2021, CVF, pp. 2714-2723 (Year: 2021).*

Generative Iamge Inpainting with Contextual Attention, Jiahui Yu et al., arXiv, 2018, pp. 1-15 (Year: 2018).*

Rethinking Image Inpainting via a Mutual Encoder-Decoderwith Feature Equalizations, Hongyu Liu et al., arXiv, 2020, pp. 1-16 (Year: 2020).*

EdgeConnect: Generative Image Inpainting with Adversarial Edge Learning, Kamyar Nazeri et al., arXiv, 2019, pp. 1-17 (Year: 2019).*

High-Resolution Image Inpainting with Iterative Confidence Feedback and Guided Upsampling, Yu Zeng et al., arXiv, 2020, pp. 1-17 (Year: 2020).*

Region Filling and Object Removal by Exemplar-Based Image Inpainting, Antonio Criminisi et al., IEEE, 2004, pp. 1200-1212 (Year: 2004).*

Barnes, C., Shechtman, E., Finkelstein, A., Goldman, D.B.: Patchmatch: A randomized correspondence algorithm for structural image editing. ACM Trans. Graph. 28(3), 24 (2009).

Bénard, P., Cole, F., Kass, M., Mordatch, I., Hegarty, J., Senn, M.S., Fleischer, K., Pesare, D., Breeden, K .—Stylizing animation by example. ACM Transactions on Graphics (TOG) 32(4), 1-12 (2013).

Bosse, S., Maniry, D., Müller, K.R., Wiegand, T., Samek, W.: Deep neural networks for no-reference and full-reference image quality assessment. IEEE Transactions on image processing 27(1), 206-219 (2017).

Burt, P.J., Adelson, E.H.: The laplacian pyramid as a compact image code. In Readings in computer vision, pp. 671-679. Elsevier (1987).

Cade, D.—The world's first fully digital created by fuji (2016), https://petapixel.com/2016/06/09/photo-history-worlds-first-fully-digital-camera-invented-fuji/2.

Darabi, S., Shechtman, E., Barnes, C., Goldman, D.B., Sen, P.: Image melding: Combining inconsistent images using patch-based synthesis. ACM Transactions on graphics (TOG) 31(4), 1-10 (2012).

Diamanti, O., Barnes, C., Paris, S., Shechtman, E., Sorkine-Hornung, O.: Synthesis of complex image appearance from limited exemplars. ACM Transactions on Graphics (TOG) 34(2), 1-14 (2015).

Duggal, S., Wang, S., Ma, W.C., Hu, R., Urtasun, R.: Deeppruner: Learning efficient stereo matching via differentiable patchmatch. In: Proceedings of the IEEE/CVF International Conference on Computer Vision. pp. 4384-4393 (2019).

Fiser, J., Jamriska, O., Lukác, M., Shechtman, E., Asente, P., Lu, J., Sykora, D.: Stylit: illumination-guided example-based stylization of 3d renderings. ACM Transactions on Graphics (TOG) 35(4), 1-11 (2016).

Gu, S., Lugmayr, A., Danelljan, M., Fritsche, M., Lamour, J., Timofte, R.: Div8k: Diverse 8k resolution image dataset. In: 2019 IEEE/C'VF International Conference on Computer Vision Workshop (ICCVW). pp. 3512-3516. IEEE (2019).

He, K., Sun, J.: Statistics of patch offsets for image completion. In: European conference on computer vision. pp. 16-29. Springer (2012).

Hertzmann, A., Jacobs, C.E., Oliver, N., Curless, B., Salesin, D.H.: Image analogies. In: Proceedings of the 28th annual conference on Computer graphics and interactive techniques. pp. 327-340 (2001).

Huang, J.B., Kang, S.B., Ahuja, N., Kopf, J.: Image completion using planar structure guidance. ACM Transactions on graphics (TOG) 33(4), 1-10 (2014).

Iizuka, S., Simo-Serra, E., Ishikawa, H.: Globally and locally consistent image completion. ACM Transactions on Graphics (ToG) 36(4), 1-14 (2017).

Jamriska, O., Sochorová, S., Texler, O., Lukác, M., Fiser, J., Lu, J., Shechtman, E., Sykora, D.: Stylizing video by example. ACM Transactions on Graphics (TOG) 38(4), 1-11 (2019).

Kaspar, A., Neubert, B., Lischinski, D., Pauly, M., Kopf, J.: Self tuning texture optimization. In: Computer Graphics Forum. vol. 34, pp. 349 359. Wiley Online Library (2015).

Li, Y., Zhao, H., Qi, X., Wang, L., Li, Z., Sun, J., Jia, J.: Fully convolutional networks for panoptic segmentation. In: Proceedings of the IEEE/ CVF Conference on Computer Vision and Pattern Recognition. pp. 214-223 (2021).

Liao, J., Yao, Y., Yuan, L., Hua, G., Kang, S.B.: Visual attribute transfer through deep image analogy. ACM Trans. Graph. 36(4), 120:1-120:15 (Jul. 2017). https://doi.org/10.1145/3072959.3073683, http://doi.acm.org/10.1145/3072959.3073683 6.

Liu, G., Reda, F.A., Shih, K.J., Wang, T.C., Tao, A., Catanzaro, B.: Image inpainting for irregular holes using partial convolutions. In: Proceedings of the European Conference on Computer Vision (ECCV). pp. 85-100 (2018).

Liu, H., Jiang, B., Song, Y., Huang, W., Yang, C.: Rethinking image inpainting via a mutual encoder-decoder with feature equalizations. arXiv preprint arXiv: 2007.06929 (2020).

Liu, W., Zhang, P., Huang, X., Yang, J., Shen, C., Reid, I.: Real-time image smoothing via iterative least squares. ACM Transactions on Graphics (TOG) 39(3), 1-24 (2020).

Nazeri, K., Ng, E., Joseph, T., Qureshi, F.Z., Ebrahimi, M.: Edgeconnect: Generative image inpainting with adversarial edge learning. arXiv preprint arXiv:1901.00212 (2019).

Parmar, G., Zhang, R., Zhu, J.Y.: On buggy resizing libraries and surprising subtleties in fid calculation. arXiv: preprint arXiv: 2104.11222 (2021).

Pathak, D., Krahenbuhl, P., Donahue, J., Darrell, T., Efros, A.A.: Context en-coders: Feature learning by inpainting. In: Proceedings of the IEEE conference on computer vision and pattern recognition. pp. 2536-2544 (2016).

Ranftl, R., Bochkovskiy, A., Koltun, V.: Vision transformers for dense prediction. In: Proceedings of the IEEE/CVF International Conference on Computer Vision. pp. 12179-12188 (2021).

Ren, Y., Yu, X., Zhang, R., Li, T.H., Liu, S., Li, G.: Structureflow: Image in-painting via structure-aware appearance flow. In: Proceedings of the IEEE/CVF International Conference on Computer Vision. pp. 181-190 (2019).

Sun, K., Zhao, Y., Jiang, B., Cheng, T., Xiao, B., Liu, D., Mu, Y., Wang, X., Liu, W., Wang, J.: High-resolution representations for labeling pixels and regions. arXiv preprint arXiv: 1904.04514 (2019).

Suvorov, R., Logacheva, E., Mashikhin, A., Remizova, A., Ashukha, A., Silvestrov, A., Kong, N., Goka, H., Park, K., Lempitsky, V.:

(56) References Cited

OTHER PUBLICATIONS

Resolution-robust large mask inpainting with fourier convolutions. WACV: Winter Conference on Applications of Computer Vision (2022).

Talebi, H., Milanfar, P.: Nima: Neural image assessment. IEEE Transactions on Image Processing 27(8), 3998-4011 (2018).

Tan, M., Le, Q.: Efficientnet: Rethinking model scaling for convolutional neural networks. In: International Conference on Machine Learning. pp. 6105-6114. PMLR (2019).

Wang, S.Y., Wang, O., Owens, A., Zhang, R., Efros, A.A.: Detecting photoshopped faces by scripting photoshop. In: Proceedings of the IEEE/ Cvf International Conference on Computer Vision. pp. 10072-10081 (2019).

Wang, S.Y., Wang, O., Zhang, R., Owens, A., Efros, A.A.: Cnn-generated images are surprisingly easy to spot . . . for now. In: Proceedings of the IEEE/CVF Conference on Computer Vision and Pattern Recognition. pp. 8695-8704 (2020).

Wang, X., Xie, L., Dong, C., Shan, Y.: Real-ergan: Training real-world blind super-resolution with pure synthetic data. In: Proceedings of the IEEE/CVF International Conference on Computer Vision. pp. 1905-1914 (2021).

Wang, Z., Bovik, A.C., Sheikh, H.R., Simoncelli, E.P.: Image quality assessment: from error visibility to structural similarity. IEEE transactions on image processing 13(4), 600-612 (2004).

Wexler, Y., Shechtman, E., Irani, M.: Space-time completion of video. IEEE Transactions on pattern analysis and machine intelligence 29(3), 463-476 (2007).

Xiong, W., Yu, J., Lin, Z., Yang, J., Lu, X., Barnes, C., Luo, J.: Foreground-aware image inpainting. In: Proceedings of the IEEE/CVF Conference on Computer Vision and Pattern Recognition. pp. 5840-5848 (2019).

Xu, L., Yan, Q., Xia, Y., Jia, J.: Structure extraction from texture via relative total variation. ACM transactions on graphics (TOG) 31(6), 1-10 (2012) 2.

Yi, Z., Tang, Q., Azizi, S., Jang, D., Xu, Z.: Contextual residual aggregation for ultra high-resolution image inpainting. In: Proceedings of the IEEE/CVF Conference on Computer Vision and Pattern Recognition. pp. 7508-7517 (2020).

Yin, W., Zhang, J., Wang, O., Niklaus, S., Mai, L., Chen, S., Shen, C.: Learning to recover 3d scene shape from a single image. In: Proc. IEEE Conf. Comp. Vis. Patt. Recogn. (CVPR) (2021).

Yu, J., Lin, Z., Yang, J., Shen, X., Lu, X., Huang, T.S.: Generative image inpainting with contextual attention. In: Proceedings of the IEEE conference on computer vision and pattern recognition. pp. 5505-5514 (2018).

Yu, J., Lin, Z., Yang, J., Shen, X., Lu, X., Huang, T.S.: Free-form image inpainting with gated convolution. In: Proceedings of the IEEE/CVF International Conference on Computer Vision. pp. 4471-4480 (2019).

Zeng, Y., Lin, Z., Yang, J., Zhang, J., Shechtman, E., Lu, H.: High-resolution image inpainting with iterative confidence feedback and guided upsampling. In: European Conference on Computer Vision. pp. 1-17. Springer (2020).

Zhang, H., Wu, C., Zhang, Z., Zhu, Y., Lin, H., Zhang, Z., Sun, Y., He, T., Mueller, J., Manmatha, R., et al.: Resnest: Split-attention networks. arXiv preprint arXiv:2004.08955 (2020).

Zhang, R., Isola, P., Efros, A.A., Shechtman, E., Wang, O.: The unreasonable effectiveness of deep features as a perceptual metric. In: Proceedings of the IEEE Conference on Computer Vision and Pattern Recognition (CVPR) (Jun. 2018).

Zhang, R., Isola, P., Efros, A.A., Shechtman, E., Wang, O.: The unreasonable effectiveness of deep features as a perceptual metric. In: Proceedings of the IEEE conference on computer vision and pattern recognition. pp. 586-595 (2018).

Zhao, S., Cui, J., Sheng, Y., Dong, Y., Liang, X., Chang, E.I., Xu, Y.: Large scale image completion via co-modulated generative adversarial networks. In: International Conference on Learning Representations (ICLR) (2021).

Zhou, B., Lapedriza, A., Khosla, A., Oliva, A., Torralba, A.: Places: A 10 million image database for scene recognition. IEEE Transactions on Pattern Analysis and Machine Intelligence (2017).

Zhou, B., Zhao, H., Puig, X., Fidler, S., Barriuso, A., Torralba, A.: Scene parsing through ade20k dataset. In: Proceedings of the IEEE conference on computer vision and pattern recognition. pp. 633-641 (2017).

Zhou, X., Zhang, B., Zhang, T., Zhang, P., Bao, J., Chen, D., Zhang, Z., Wen, F.: Cocosnet v2: Full-resolution correspondence learning for image translation. In: Proceedings of the IEEE/CVF Conference on Computer Vision and Pattern Recognition. pp. 11465-11475 (2021).

Zhu, H., Li, L., Wu, J., Dong, W., Shi, G.: Metaiqa: Deep meta-learning for no reference image quality assessment. In: Proceedings of the IEEE/CVF Conference on Computer Vision and Pattern Recognition. pp. 14143-14152 (2020).

Zhu, H., Li, L., Wu, J., Dong, W., Shi, G.: Generalizable no-reference image quality assessment via deep meta-learning. IEEE Transactions on Circuits and Systems for Video Technology (2021).

Zhu, J.Y., Krahenbuhl, P., Shechtman, E., Efros, A.A.—Learning a discriminative model for the perception of realism in composite images. In: Proceedings of the IEEE International Conference on Computer Vision, Oct. 2015.

Zhu, M., He, D., Li, X., Li, C., Li, F., Liu, X., Ding, E., Zhang, Z.—Image inpainting by end-to-end cascaded refinement with mask awareness. IEEE Transactions on Image Processing Apr. 30, 2021.

\* cited by examiner

| Method | Accuracy | Accuracy for Easy Cases |
|---|---|---|
| Human Performance | 57.1% (+0.7%) | 86.1% (+1.4%) |
| Our Curation Network | 56.4% | 84.7% |
| Ours No Pretraining | 53.9% (−2.5%) | 78.8% (−5.9%) |
| Ours Fewer Augmentations | 53.8% (−2.7%) | 77.8% (−6.9%) |
| Ours No Mask | 52.6% (−3.8%) | 72.2% (−12.5%) |
| Ours Late Fusion Variant | 52.6% (−3.9%) | 82.1% (−2.6%) |
| Ours Early Fusion | 51.4% (−5.1%) | 77.8% (−6.9%) |
| Ours Freeze Backbone | 43.7% (−12.7%) | 53.0% (−33.1%) |
| NIMA w/ MLP | 41.4% (−15.0%) | 50.0% (−34.7%) |
| MetaIQA+ w/ MLP | 41.1% (−15.3%) | 50.4% (−34.3%) |
| Random Chance | 33.1% (−23.3%) | 30.6% (−54.2%) |

*Fig. 6*

| Methods | LPIPS ↓ | FID ↓ Full | FID ↓ Patch | P-IDS ↑ Full | P-IDS ↑ Patch | U-IDS ↑ Full | U-IDS ↑ Patch | User Pref. ↑ Full Image | User Pref. ↑ Boundary Patch |
|---|---|---|---|---|---|---|---|---|---|
| EdgeConnect | 0.05017 | 35.06 | 41.05 | 0.04 | 4.56 | 0.00 | 0.55 | - | - |
| Deepfillv2 | 0.05295 | 32.87 | 36.06 | 5.54 | 5.47 | 1.35 | 0.84 | - | - |
| MEDFE | 0.05170 | 33.97 | 60.87 | 0.48 | 2.23 | 0.00 | 0.26 | - | - |
| HiFill | 0.05213 | 34.39 | 31.74 | 4.15 | 5.20 | 0.75 | 0.97 | - | - |
| CoModGAN | 0.05099 | 24.81 | 32.08 | 14.72 | 7.01 | 4.47 | 1.51 | 26 | 17 |
| MADF | 0.04773 | 23.62 | 33.21 | 10.48 | 6.81 | 2.14 | 1.48 | 6 | 12 |
| ProFill | 0.04783 | 24.25 | 31.26 | 11.35 | 6.89 | 2.26 | 1.31 | 10 | 16 |
| LaMa | 0.04588 | 19.20 | 35.95 | 17.24 | 6.86 | 5.62 | 1.38 | 28 | 22 |
| GPFill (Ours) | 0.04156 | 18.74 | 15.63 | 22.46 | 19.77 | 10.70 | 10.22 | 128 | 133 |

*Fig. 7*

| Methods | LPIPS ↓ | FID ↓ | User Pref. ↑ |
|---|---|---|---|
| ProFill + SR | 0.0478 | 24.2589 | 21 |
| ProFill + Ours | 0.0425 | 20.4362 | 179 |
| CoModGAN + SR | 0.0510 | 24.8189 | 36 |
| CoModGAN + Ours | 0.0430 | 19.9224 | 164 |
| MADF + SR | 0.0477 | 23.6290 | 27 |
| MADF + Ours | 0.0421 | 19.9022 | 173 |
| LaMa + SR | 0.04588 | 19.2022 | 42 |
| LaMa + Ours | 0.04156 | 18.7414 | 158 |

*Fig. 8*

| Methods | LPIPS ↓ | FID ↓ | User Pref. ↑ |
|---|---|---|---|
| Content-Aware Fill | 0.04675 | 23.0068 | 16 |
| Random Guided PM | 0.04281 | 19.7704 | 24 |
| GPFill (Ours) | 0.04156 | 18.7414 | 60 |

*Fig. 9*

GENERATING MODIFIED DIGITAL IMAGES VIA IMAGE INPAINTING USING MULTI-GUIDED PATCH MATCH AND INTELLIGENT CURATION

BACKGROUND

Recent years have seen significant advancement in hardware and software platforms for digital image inpainting to reconstruct missing or flawed regions of digital images. For instance, some digital editing systems utilize inpainting functions to remove unwanted objects or distracting elements from digital images and to automatically fill the region of the removed pixels with a plausible result. To illustrate, many digital image editing systems implement patch-based approaches to borrow example pixels from other portions of a digital image and fill the missing or flawed region using those pixels. Despite these advancements, conventional digital image editing systems often fail to flexibly select appropriate example pixels, leading to implausible results. Further, many of these systems fail to generate inpaintings that accurately reflect a scene at the high resolutions that are typically associated with modern image capturing devices.

SUMMARY

One or more embodiments described herein provide benefits and/or solve one or more of the foregoing or other problems in the art with systems, methods, and non-transitory computer-readable media that implement a flexible model framework to generate modified digital images with accurate inpainted regions at high resolutions. In particular, in one or more embodiments, the disclosed systems employ a hybrid pipeline of deep networks and patch-based synthesis to fill in a region of a digital image. For instance, in some embodiments, the disclosed systems utilize a deep network to establish a reasonable semantic layout and structure inside the region. The disclosed systems further extract and utilize several image guides for patch-based image inpainting. The disclosed systems generate multiple candidate inpainting results from the image guides and select an inpainted image from among the results using a curation module that makes subtle comparisons and contrasts between candidates. In this manner, the disclosed systems generate modified digital images using flexibly-selected example pixels for high resolution results that accurately reflect depicted scenes.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 6 illustrates a table reflecting additional experimental results regarding the effectiveness of the guided inpainting curation system in accordance with one or more embodiments;

FIG. 7 illustrates an additional table reflecting further experimental results regarding the effectiveness of the guided inpainting curation system in accordance with one or more embodiments;

FIG. 8 illustrates another table reflecting yet further experimental results regarding the effectiveness of the guided inpainting curation system in accordance with one or more embodiments;

FIG. 9 illustrates another table reflecting further experimental results regarding the effectiveness of the guided inpainting curation system in accordance with one or more embodiments;

DETAILED DESCRIPTION

Figure 1:
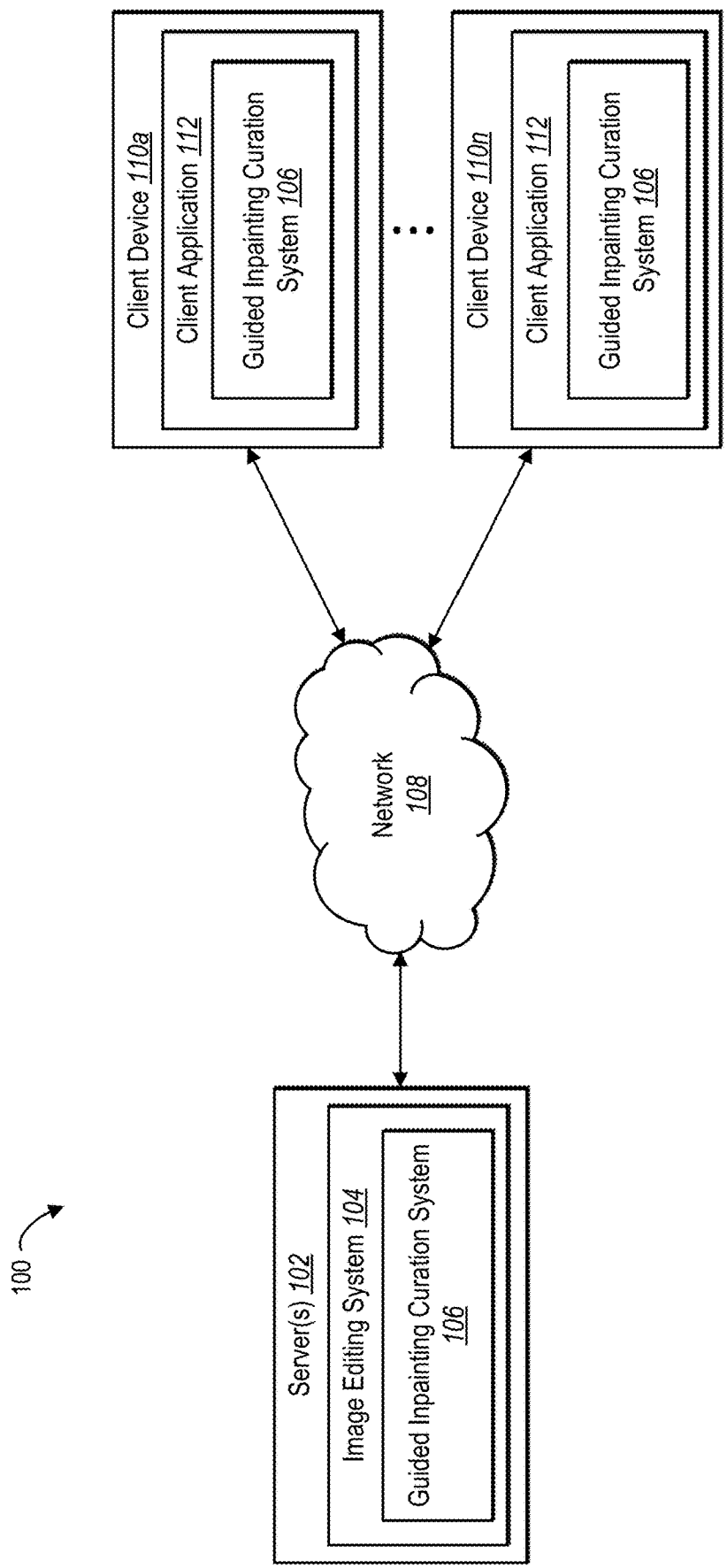
FIG. 1 illustrates an example environment in which a guided inpainting curation system operates in accordance with one or more embodiments.

One or more embodiments described herein include a guided inpainting curation system that generates high fidelity modified digital images via a flexible inpainting framework. For instance, in one or more embodiments, the guided inpainting curation system utilizes a deep inpainting model to plausibly fill a hole of a digital image. Additionally, in some embodiments, the guided inpainting curation system establishes one or more guide images that emphasize various attributes of the digital image, such as structure, segmentation, and depth. In some cases, the guided inpainting curation system applies a multiply-guided patch match algorithm to generate several candidate upsampled inpainted images from combinations of the guide images. The guided inpainting curation system feeds the candidates to a curation module that chooses an optimal inpainting via an antisymmetric pairwise preference matrix.

To illustrate, in one or more embodiments, the guided inpainting curation system receives, from a client device, a digital image comprising a region of pixels to replace. The guided inpainted curation system utilizes a visual guide algorithm to generate at least one deep visual guide for replacing the region of pixels of the digital image. Using a patch match model and the at least one deep visual guide, the guided inpainting curation system generates a plurality of modified digital images by replacing the region of pixels of the digital image with replacement pixels. Further, the guided inpainted curation system utilizes an inpainting curation model to select a modified digital image from the plurality of modified digital images to provide to the client device.

As just mentioned, in one or more embodiments, the guided inpainting curation system modifies digital images having pixels to be replaced using an inpainting framework. For instance, in some embodiments, the guided inpainting curation system modifies digital images having a region of pixels that have been removed by filling in the region with replacement pixels. In some implementations, the inpainting framework includes various computer-implemented models that generate initial inpainted digital images, generate deep visual guides for identifying/generating replacement pixels, modify digital images using replacement pixels, and/or select a final result from among a set modified digital images.

For instance, in one or more embodiments, the guided inpainting curation system utilizes a deep inpainting neural network to generate, from a digital image, an inpainted digital image. In particular, in some embodiments, the guided inpainting curation system utilizes the deep inpainting neural network to replace the region of pixels of the digital image using an initial set of replacement pixels. In some cases, the initial set of replacement pixels establishes a semantic layout and/or a structure within the region.

Additionally, in some implementations, the guided inpainting curation system utilizes one or more deep visual guide algorithms to generate one or more deep visual guides. In particular, in some cases, the guided inpainting curation system generates the one or more deep visual guides form the inpainted digital image having the initial set of replacement pixels. In one or more embodiments, the guided inpainting curation system generates the one or more deep visual guides by generating a structure image guide, a depth image guide, and/or a segmentation image guide.

Further, in some embodiments, the guided inpainting curation system utilizes a patch match model to generate a plurality of modified digital images by replacing the region of the digital image with replacement pixels. In particular, in some cases, the guided inpainting curation system generates the plurality of modified digital images based on the one or more deep visual guides. To illustrate, in some implementations, the guided inpainting curation system utilizes the patch match model to generate a plurality of modified digital images based on combinations of deep visual guides. In some cases, the guided inpainting system assigns a weighting to each of the deep visual guides in a particular combination and generates a modified digital image based on the weighted combination.

As further mentioned above, in one or more embodiments, the guided inpainting curation system utilizes an inpainting curation model to select a modified digital image. Indeed, in some cases, the guided inpainting curation system utilizes the inpainting curation model to analyze the plurality of modified digital images generated from the deep visual guide(s) and select one of the modified digital images as the inpainting result. For example, in some instances, the guided inpainting curation system provides a modified digital image selected via the inpainting curation model to a client device that requested or otherwise triggered the inpainting process.

To illustrate, in one or more embodiments, the guided inpainting curation system utilizes the inpainting curation model to generate an antisymmetric preference matrix for the plurality of modified digital images. The guided inpainting curation system further utilizes the inpainting curation model to populate the antisymmetric preference matrix with preference values that represent the preference for a given modified digital image when paired with another modified digital image from the plurality of digital images. Based on the preference values, the inpainting curation model selects one of the modified digital images as the inpainting result (e.g., the modified digital image with the highest total or the highest averages of preference values). Accordingly, in some cases, the guided inpainting curation system selects a modified digital image having an optimal set of replacement pixels.

As mentioned above, conventional digital image editing systems suffer from several technological shortcomings that result in inflexible and inaccurate operation. For instance, many conventional systems are inflexible in that they take rigid approaches to generate a final inpainting result. In particular, in many cases, conventional systems implement models that identify and/or generate replacement pixels for digital images in the same manner, regardless of the nature of a given digital image. To illustrate, while some conventional systems utilize a guide image to facilitate the inpainting process, such systems typically utilize the same guide image for all digital images. These systems often fail to consider the properties of a particular digital image and how those properties require the use of another approach to provide a plausible inpainting result.

Further, conventional digital image editing systems often suffer from inaccuracies. Indeed, many conventional systems generate inpaintings where the replacement pixels fail to accurately reflect and/or blend into the scene of their respective digital image. In some cases, the resolution of the replacement pixels is poor, leading to a comparatively poor portrayal of the scene within a filled region. To illustrate, some conventional systems implement deep convolutional methods to generate inpaintings. Such methods, however, often fail to capture realistic textures. Some existing systems utilize patch-based methods to improve the texture quality; however, these methods typically fail to capture the structure and semantics of a digital image. Thus, both approaches fail to produce results that appear plausible.

The guided inpainting curation system provides several advantages over conventional systems. For example, the guided inpainting curation system improves the flexibility of implementing computing devices when compared to conventional systems. To illustrate, by generating a plurality of modified digital images using combinations of deep visual guides and selecting a modified digital image to use as the inpainting result, the guided inpainting curation system improves the flexibility with which inpainting results are provided. Indeed, the guided inpainting curation system implements a plurality of approaches to generate multiple modified digital images and flexibly selects an optimal modified digital image as the result based on its preference scores. Thus, the guided inpainting curation system flexibly provides inpainting results that are tailored to the properties of their respective digital images.

Additionally, the guided inpainting curation system can improve the accuracy of implementing computing devices when compared to conventional systems. Indeed, the guided inpainting curation system provides regions of replacement pixels that more accurately reflect and/or blend in with the scene of their respective digital image. For instance, by using the inpainting framework described above, the guided inpainting curation system provides, within its inpainting results, accurate structure and/or semantic layout established by the deep inpainting neural network while further providing high-resolution textures via the patch match model.

Additional details regarding the guided inpainting curation system will now be provided with reference to the figures. For example, FIG. 1 illustrates a schematic diagram of an exemplary system environment ("environment") 100 in which a guided inpainting curation system 106 operates.

As illustrated in FIG. 1, the environment 100 includes a server(s) 102, a network 108, and client devices 110a-110n.

Although the environment 100 of FIG. 1 is depicted as having a particular number of components, the environment 100 is capable of having any number of additional or alternative components (e.g., any number of servers, client devices, or other components in communication with the guided inpainting curation system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 12). Moreover, the server(s) 102 and the client devices 110a-110n include one of a variety of computing devices (including one or more computing devices as discussed in greater detail with relation to FIG. 12).

As mentioned above, the environment 100 includes the server(s) 102. In one or more embodiments, the server(s) 102 generates, stores, receives, and/or transmits data including neural networks, digital images, and modified digital images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110a-110n) generates, edits, manages, and/or stores digital images. For example, in some instances, a client device sends a digital image to the image editing system 104 hosted on the server(s) 102 via the network 108. The image editing system 104 then provides options that the client device may use to edit the digital image, store the digital image, and subsequently search for, access, and view the digital image. For instance, in some cases, the image editing system 104 provides one or more options that the client device may use to replace pixels within the digital image.

Additionally, the server(s) 102 include the guided inpainting curation system 106. In one or more embodiments, via the server(s) 102, the guided inpainting curation system 106 modifies a digital image by replacing pixels within a region of the digital image. For instance, in some cases, the guided inpainting curation system 106, via the server(s) 102, utilizes one or more visual guide algorithms to generate one or more deep visual guides for the digital image. Via the server(s) 102, the guided inpainting curation system 106 further uses a patch match model to generate a plurality of modified digital images having replacement pixels within a replacement region based on the deep visual guide(s). Further, the guided inpainting curation system 106, via the server(s) 102, selects a modified digital image from the plurality of modified digital images as an inpainting result (e.g., as the final result). Example components of the guided inpainting curation system 106 will be described below with regard to FIG. 10.

In one or more embodiments, the client devices 110a-110n include computing devices that can access, edit, modify, store, and/or provide, for display, digital images, including modified digital images having replacement pixels. For example, the client devices 110a-110n include smartphones, tablets, desktop computers, laptop computers, head-mounted-display devices, or other electronic devices. The client devices 110a-110n include one or more applications (e.g., the client application 112) that can access, edit, modify, store, and/or provide, for display, digital images, including modified digital images having replacement pixels. For example, in some embodiments, the client application 112 includes a software application installed on the client devices 110a-110n. In other cases, however, the client application 112 includes a web browser or other application that accesses a software application hosted on the server(s) 102.

The guided inpainting curation system 106 can be implemented in whole, or in part, by the individual elements of the environment 100. Indeed, as shown in FIG. 1 the guided inpainting curation system 106 can be implemented with regard to the server(s) 102 and/or at the client devices 110a-110n. In particular embodiments, the guided inpainting curation system 106 on the client devices 110a-110n comprises a web application, a native application installed on the client devices 110a-110n (e.g., a mobile application, a desktop application, a plug-in application, etc.), or a cloud-based application where part of the functionality is performed by the server(s) 102.

In additional or alternative embodiments, the guided inpainting curation system 106 on the client devices 110a-110n represents and/or provides the same or similar functionality as described herein in connection with the guided inpainting curation system 106 on the server(s) 102. In some implementations, the guided inpainting curation system 106 on the server(s) 102 supports the guided inpainting curation system 106 on the client devices 110a-110n.

For example, in some embodiments, the guided inpainting curation system 106 on the server(s) 102 train one or more machine learning models described herein. The guided inpainting curation system 106 on the server(s) 102 provides the one or more trained machine learning models to the guided inpainting curation system 106 on the client devices 110a-110n for implementation. Accordingly, although not illustrated, in one or more embodiments the client devices 110a-110n utilize the one or more trained machine learning models to modify digital images by replacing a region of pixels therein.

In some embodiments, the guided inpainting curation system 106 includes a web hosting application that allows the client devices 110a-110n to interact with content and services hosted on the server(s) 102. To illustrate, in one or more implementations, the client devices 110a-110n accesses a web page or computing application supported by the server(s) 102. The client devices 110a-110n provide input to the server(s) 102 (e.g., a digital image with a region of pixels to be replaced). In response, the guided inpainting curation system 106 on the server(s) 102 utilizes the trained machine learning models to generate a modified digital image from the digital image using a set of replacement pixels within the region. The server(s) 102 then provides the modified digital image to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server(s) 102, bypassing the network 108. As another example, the environment 100 includes a third-party server comprising a content server and/or a data collection server.

Figure 2:
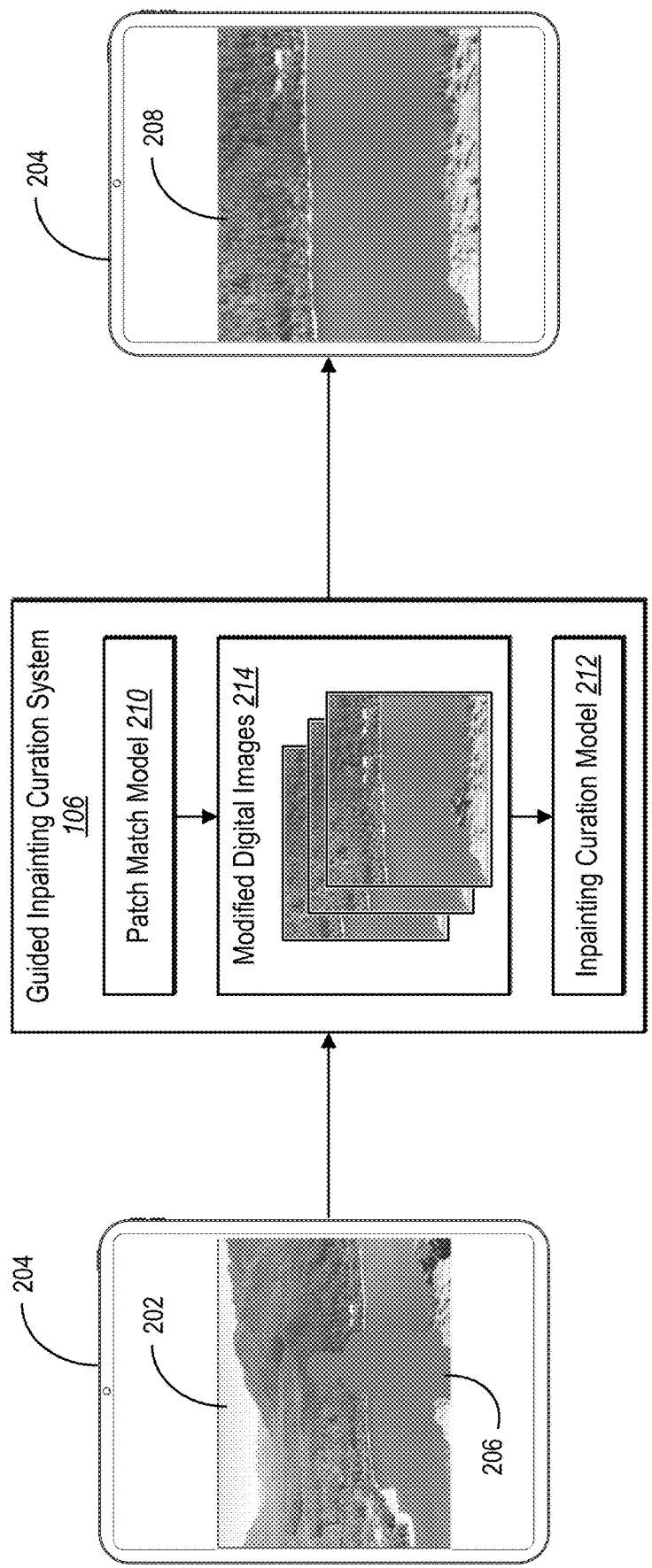
FIG. 2 illustrates an overview diagram of the guided inpainting curation system modifying a digital image by replacing pixels in accordance with one or more embodiments.

As mentioned above, the guided inpainting curation system 106 modifies a digital image by replacing pixels within a region of the digital image. FIG. 2 illustrates an overview diagram of the guided inpainting curation system 106 modifying a digital image by replacing pixels therein in accordance with one or more embodiments.

As shown in FIG. 2, the guided inpainting curation system 106 receives a digital image 202. For example, as indicated, the guided inpainting curation system 106 receives the digital image 202 from a client device 204. To illustrate, in some cases, the guided inpainting curation system 106 receives, from the client device 204, a copy of digital image 202, a link to the digital image 202, or some other indication identifying the digital image 202 and/or a location of the digital image 202.

As shown in FIG. 2, the digital image 202 includes a region of pixels 206 to be replaced. For instance, in some cases, the region of pixels 206 corresponds to an object (shown as a person here) that has been or is being removed from the digital image 202 or corresponds to out of place or otherwise missing pixels within the digital image 202. In other cases, the region of pixels 206 include pixels that the client device 204 indicates (e.g., via one or more user interactions) should be replaced with a set of replacement pixels.

As further shown in FIG. 2, the guided inpainting curation system 106 generates a modified digital image 208 from the digital image 202. In particular, the guided inpainting curation system 106 generates the modified digital image 208 by replacing or filling in the region of pixels 206 with a set of replacement pixels. For instance, as illustrated by FIG. 2, the guided inpainting curation system 106 generates the modified digital image 208 utilizing a patch match model 210 and an inpainting curation model 212.

In particular, in one or more embodiments, the guided inpainting curation system 106 utilizes the patch match model 210 to analyze the digital image and generate a plurality of modified digital images 214 based on the analysis. In one or more embodiments, a patch match model includes a computer-implemented model or algorithm that modifies a digital image using replacement pixels. In particular, in some embodiments, a patch match model includes a computer-implemented model or algorithm that searches for and/or identifies replacement pixels from a digital image for replacing, filling, or otherwise inpainting one or more regions of pixels within the digital image. For example, in some embodiments, a patch match model modifies a digital image to replace a region of pixels with other pixels from the digital image that are visually cohesive. In some cases, a patch match model utilizes a cost function to identify pixels via one or more pixel sampling techniques (e.g., random or probabilistic) and compares those pixels with pixels in and/or the region of pixels to be replaced. In some embodiments, the guided inpainting curation system 106 utilizes, as the patch match model 210, the patch match model described in U.S. patent application Ser. No. 17/202,019 filed on Mar. 15, 2021, entitled GENERATING MODIFIED DIGITAL IMAGES USING DEEP VISUAL GUIDED PATCH MATCH MODELS FOR IMAGE INPAINTING, the contents of which are expressly incorporated herein by reference in their entirety.

Indeed, as will be discussed in more detail below, in one or more embodiments, the guided inpainting curation system 106 generates one or more deep visual guides corresponding to the digital image 202. The guided inpainting curation system 106 further generates the plurality of modified digital images 214 using the patch match model 210 and the deep visual guide(s). For instance, as will be detailed, in some cases, the guided inpainting curation system 106 generates the plurality of modified digital images 214 by replacing the region of pixels 206 with a set of replacement pixels using one or more combinations of deep visual guides.

Further, in one or more embodiments, the guided inpainting curation system 106 utilizes the inpainting curation model 212 to select a modified digital image (e.g., the modified digital image 208) from the plurality of modified digital images 214. In one or more embodiments, an inpainting curation model includes a computer-implemented model or algorithm that selects an inpainting result for a digital image having a region of pixels to be replaced from among multiple optional inpainting results. In particular, in some embodiments, an inpainting curation model includes a computer-implemented model or algorithm that selects a modified digital image from a plurality of modified digital images that include replacement pixels and were generated from a digital image having a region of pixels to be replaced. For instance, in some cases, an inpainting curation model scores or otherwise determines preferences among a plurality of modified digital images and selects a modified digital image associated with a highest score or preference. In some implementations, an inpainting curation model includes one or more neural networks. The architecture and operation of an inpainting curation model will be provided in more detail below.

As shown in FIG. 2, the guided inpainting curation system 106 provides the modified digital image 208 to the client device 204 for display. Thus, in response to receiving the digital image 202 from the client device 204, the guided inpainting curation system 106 implements an inpainting framework and provides the inpainting results for display via the client device 204.

Figure 3:
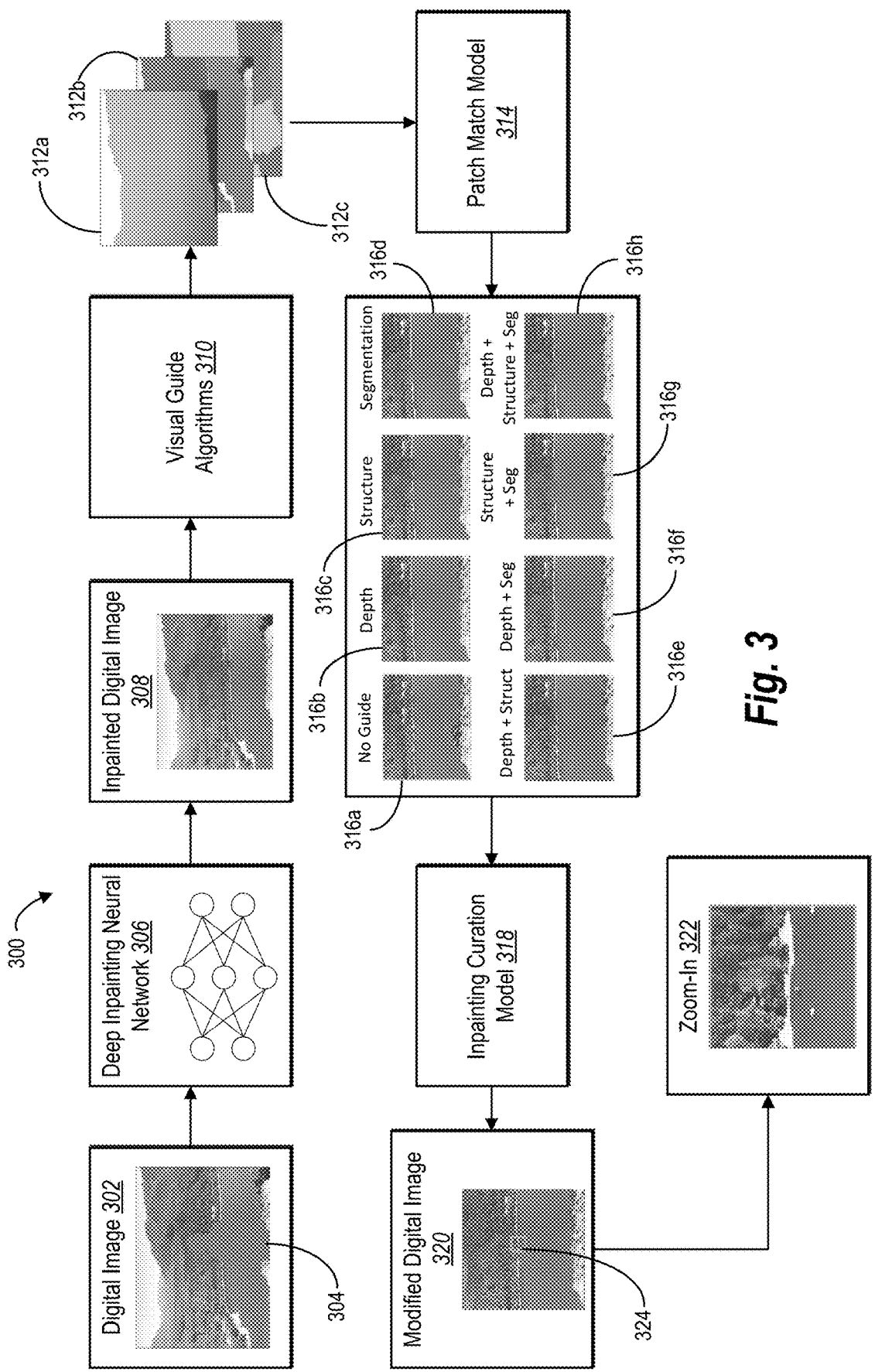
FIG. 3 illustrates an inpainting framework used by the guided inpainting curation system to generate and curate inpainting results in accordance with one or more embodiments.

FIG. 3 illustrates an inpainting framework 300 used by the guided inpainting curation system 106 to generate and curate inpainting results (e.g., modified digital images with replacement pixels) in accordance with one or more embodiments. Indeed, as shown in FIG. 3, the guided inpainting curation system 106 receives a digital image 302 having a region of pixels 304 to be replaced. As further shown in FIG. 3, the guided inpainting curation system 106 utilizes a deep inpainting neural network 306 to generate an inpainted digital image 308 from the digital image 302.

In one or more embodiments, an inpainted digital image includes a digital image that is (preliminarily) inpainted. In particular, in some embodiments, an inpainted digital image includes a digital image having a region of pixels that is preliminarily filled/replaced with an initial set of replacement pixels. Indeed, in some implementations, an inpainted digital image includes a rough result or otherwise unfinalized inpainting result. In some cases, the initial set of replacement pixels establish a semantic layout and/or structure within the region of pixels to be replaced. Further, in some implementations, an inpainted digital image has a resolution that is lower than the resolution of the digital image from which the inpainted digital image was created.

Additionally, in one or more embodiments, a neural network includes a type of machine learning model, which can be tuned (e.g., trained) based on inputs to approximate unknown functions used for generating the corresponding outputs. In particular, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

Further, in one or more embodiments, a deep inpainting neural network includes a computer-implemented neural network that generates inpainted digital images. In particular, in some embodiments, a deep inpainting neural network includes a computer-implemented neural network that analyzes a digital image having a region of pixels to be replaced, identifies an initial set of replacement pixels, and modifies the digital image using the initial set of replacement pixels. Indeed, in some cases, the deep inpainting neural network modifies the digital image by filling/replacing the region of pixels using the initial set of replacement pixels. In one or more embodiments, the guided inpainting curation system 106 utilizes, as the deep inpainting neural network 306, the deep inpainting neural network described in U.S. patent application Ser. No. 17/202,019. As another example, in some implementations, the guided inpainting curation system 106 utilizes, as the deep inpainting neural network 306, the large mask inpainting (LaMa) model described by Roman Suvorov et al., *Resolution-robust Large Mask Inpainting with Fourier Convolutions*, WACV: Winter Conference on Applications of Computer Vision, 2022 or the cascaded modulation inpainting neural network as described by DIGITAL IMAGE INPAINTING UTILIZING A CASCADED MODULATION INPAINTING NEURAL NETWORK, application Ser. No. 17/661,985, filed on May 4, 2022, which are incorporated herein by reference in their entirety.

Additionally, as shown in FIG. 3, the guided inpainting curation system 106 utilizes visual guide algorithms 310 to generate a plurality of deep visual guides from the inpainted digital image 308. In particular, as shown in FIG. 3, the guided inpainting curation system 106 utilizes an image depth neural network to generate an image depth guide 312a, a structure image model to generate a structure image guide 312b, and a segmentation image neural network to generate a segmentation image guide 312c.

In one or more embodiments, a deep visual guide includes a guide that instructs or informs another computer-implemented model (e.g., a patch match model) to identify replacement pixels for filling a region of a digital image. In particular, in some embodiments, a deep visual guide includes a digital and/or visual representation of one or more characteristics of a digital image. For instance, in some implementations, a deep visual guide includes a digital and/or visual representation of one or more structures within a digital image, one or more depths within a digital image, and/or one or more segmentations (e.g., instance segmentations, semantic segmentations, or panoptic segmentations) within a digital image.

Indeed, in one or more embodiments, as suggested above, a deep visual guide includes a structure image guide that indicates one or more structures within a digital image (e.g., a structural image where pixels designate objects or structures and edges or boundaries between the objects/structures). The guided inpainting curation system 106 can utilize a variety of models or architectures to generate a structural image guide. For example, in some embodiments, the guided inpainting curation system utilizes the model described by Xu, L., Yan, Q., Xia, Y., Jia, J. in Structure extraction from texture via relative total variation. ACM transactions on graphics (TOG) 31(6), 1-10 (2012) or another structure extraction model.

Additionally, in some embodiments, a deep visual guide includes an image depth guide that indicates one or more depths within a digital image (e.g., a depth map where pixels reflect distances of objects from a viewer or camera capturing the digital image). The guided inpainting curation system 106 can utilize a variety of models or architectures to generate a depth visual guide. For example, in some implementations, the guided inpainting curation system 106 utilizes the model described by Yin, W., Zhang, J., Wang, O., Niklaus, S., Mai, L., Chen, S., Shen, C. in Learning to recover 3D scene shape from a single image, Proc. IEEE Conf. Comp. Vis. Patt. Recogn. (CVPR) (2021). In some embodiments, the guided inpainting curation system 106 utilizes the model described by DYNAMIC LOG DEPTH COMPRESSION ESTIMATION SYSTEM, U.S. patent application Ser. No. 17/656,605, filed on Mar. 25, 2022, which is incorporated by reference in its entirety herein.

Further, in some cases, a deep visual guide includes segmentation image guide that indicates one or more segmentations within the digital image (e.g., a segmentation image where pixels reflect labels of different segmented portions within the digital image). The guided inpainting curation system 106 can utilize a variety of models or architectures to generate a segmentation image guide. For example, in some embodiments, the guided inpainting curation system 106 utilizes a panoptic segmentation model such as the model described by Li, Y., Zhao, H., Qi, X., Wang, L., Li, Z., Sun, J., Jia, J. in Fully convolutional networks for panoptic segmentation, Proceedings of the IEEE/CVF Conference on Computer Vision and Pattern Recognition. pp. 214-223 (2021) or another segmentation model.

In some cases, a deep visual guide includes a combination of two or more of the deep visual guides described above. In some cases, a deep visual guide includes one or more other types of guides, such as an image color guide that indicates one or more colors within a digital image, an image normal guide that indicates one or more digital image normals within a digital image, and/or an image edge guide that indicates one or more edges identified within a digital image.

In one or more embodiments, a visual guide algorithm includes a computer-implemented model or algorithm that generates a deep visual guide. In particular, in some embodiments, a visual guide algorithm includes a computer-implemented model or algorithm that analyzes one or more aspects or characteristics of a digital image and generates a deep visual guide based on the analysis. For instance, in some cases, a visual guide algorithm generates a deep visual guide from an inpainted digital image that was created from a digital image having a region of pixels to be replaced. In some implementations, however, a visual guide algorithm generates a deep visual guide directly from a digital image having a region of pixels to be replaced. As indicated above, in some cases, a visual guide algorithm includes an image depth neural network, a structure image model, or a structure image guide. In some embodiments, a visual guide algorithm includes a generator neural network or a teacher-student neural network framework. In one or more embodiments, the guided inpainting curation system 106 utilizes, as the visual guide algorithms 310 one or more of the visual guide algorithms described in U.S. patent application Ser. No. 17/202,019 or the models discussed above with regard to generating visual guides.

As further shown in FIG. 3, the guided inpainting curation system 106 utilizes a patch match model 314 to generate a plurality of modified digital images 316a-316h from the digital image 302. In particular, the guided inpainting curation system 106 utilizes the patch match model 314 to generate the plurality of modified digital images 316a-316h from the digital image 302 based on the deep visual guides (e.g., the image depth guide 312a, the structure image guide 312b, and the segmentation image guide 312c).

Indeed, as indicated by FIG. 3, the guided inpainting curation system 106 generates the plurality of modified digital images 316a-316h based on combinations of the deep visual guides. For instance, as shown, the guided inpainting curation system 106 generates the modified digital image 316a based on a combination that does not involve any of the deep visual guides (e.g., the guided inpainting curation system 106 uses the patch match model 314 to generate a default modified digital image). Similarly, the guided inpainting curation system 106 generates the modified digital images 316b-316d based on the image depth guide 312a, the structure image guide 312b, and the segmentation image guide 312c, respectively. Further, the guided inpainting curation system 106 generates the modified digital images 316e-316g based on combinations that include pairs of the deep visual guides and generates the modified digital image 316f based on a combination that includes all of the deep visual guides. Thus, in one or more embodiments, the guided inpainting curation system 106 generates the plurality of modified digital images 316a-316h using various available combinations of the deep visual guides.

Though FIG. 3 illustrates generating modified digital images using a particular number of deep visual guides and a particular number of combinations of the deep visual guides, it should be understood that the guided inpainting curation system 106 can generate modified digital images using various numbers and/or combinations of deep visual guides. In other words, the guided inpainting curation system 106 more generally generates at least one deep visual guide and generates a plurality of modified digital images using the at least one deep visual guide.

In one or more embodiments, the guided inpainting curation system 106 implements the patch match model 314 via the method (and default hyperparameters) described by Y. Wexler et al., *Spacetime Completion of Video*, IEEE Transactions on Pattern Analysis and Machine Intelligence 29(3), 463-476, 2007, which is incorporated herein by reference in its entirety. As mentioned in some embodiments, the guided inpainting curation system 106 implements the patch match model described in U.S. patent application Ser. No. 17/202, 019 and utilizes the default hyperparameters (e.g., 7×7 patches). Further, in some implementations, the guided inpainting curation system 106 implements the gain and bias term described by S. Darabi et al., *Image Melding: Combining Inconsistent Images Using Patch-based Synthesis*, ACM Transactions on Graphics (TOG) 31(4), 1-10, 2012, which is incorporated herein by reference in its entirety.

In one or more embodiments, the guided inpainting curation system 106 utilizes a cost function of the patch match model 314 to identify and select replacement pixels from the digital image 302. For instance, in some cases, the guided inpainting curation system 106 utilizes a cost function that determines distances between pixels that are to be replaced and potential replacement pixels. To illustrate, in some cases, the guided inpainting curation system 106 utilizes a sum of squared differences (SSD) between potential replacement pixels and the pixels to be replaced in three-channel color space.

In one or more embodiments, to generate a modified digital image based on at least one deep visual guide, the guided inpainting curation system 106 modifies the cost function of the patch match model 314. For instance, instead of computing the SSD over a three-channel image, the guided inpainting curation system 106 determines a weighted SSD over a 3+m channel image with channel weight $w_i$ where the first three channels are RGB color channels and the remaining channels represent the deep visual guides. To illustrate, in one or more embodiments, the guided inpainting curation system 106 determines the weight $w_i$ for each channel as follows:

$$w_i = \begin{cases} w_c/3 & i \leq 3 \\ (1-w_c)/m & i > 3 \end{cases} \quad (1)$$

In equation 1, $w_c$ represents the weighting provided to the set of color channels. As an example, in some implementations, the guided inpainting curation system 106 determines $w_c=0.6$ if a structure image guide is not being used and $w_c=0.3$ otherwise. Indeed, in some cases, the guided inpainting curation system 106 determines that structure and RGB information has a high correlation and decreases the RGB weight where a structure image guide is used.

As mentioned above, in some cases, the guided inpainting curation system 106 utilizes the gain and bias term described by S. Darabi et al. Indeed, in some implementations, the guided inpainting curation system 106 utilizes the gain and bias term to improve the quality of the inpainting results for digital images in which subtle gradients exist (e.g., in the sky). In some cases, the guided inpainting curation system 106 implements the gain and bias term within RGB color space and using a min and max of [−0.05, 0.05] times the maximum channel value (e.g., 255).

As illustrated in FIG. 3, the guided inpainting curation system 106 selects a modified digital image 320 from the plurality of modified digital images 316a-316f. In particular, the guided inpainting curation system 106 selects the modified digital image 320 using an inpainting curation model 318. Indeed, as will be discussed below with reference to FIG. 4, the guided inpainting curation system 106 utilizes the inpainting curation model 318 to select an optimal (e.g., preferred or highest scoring) modified digital image as the inpainting result in some cases. The image 322 shown in FIG. 3 represents a zoom-in of the portion of the modified digital image 320 outlined by the box 324. As indicated by the image 322, the modified digital image 320 selected via the inpainting curation model 318 provides high resolution, cohesive inpainting results in replacing the region of pixels 304 from the digital image 302.

Figure 4:
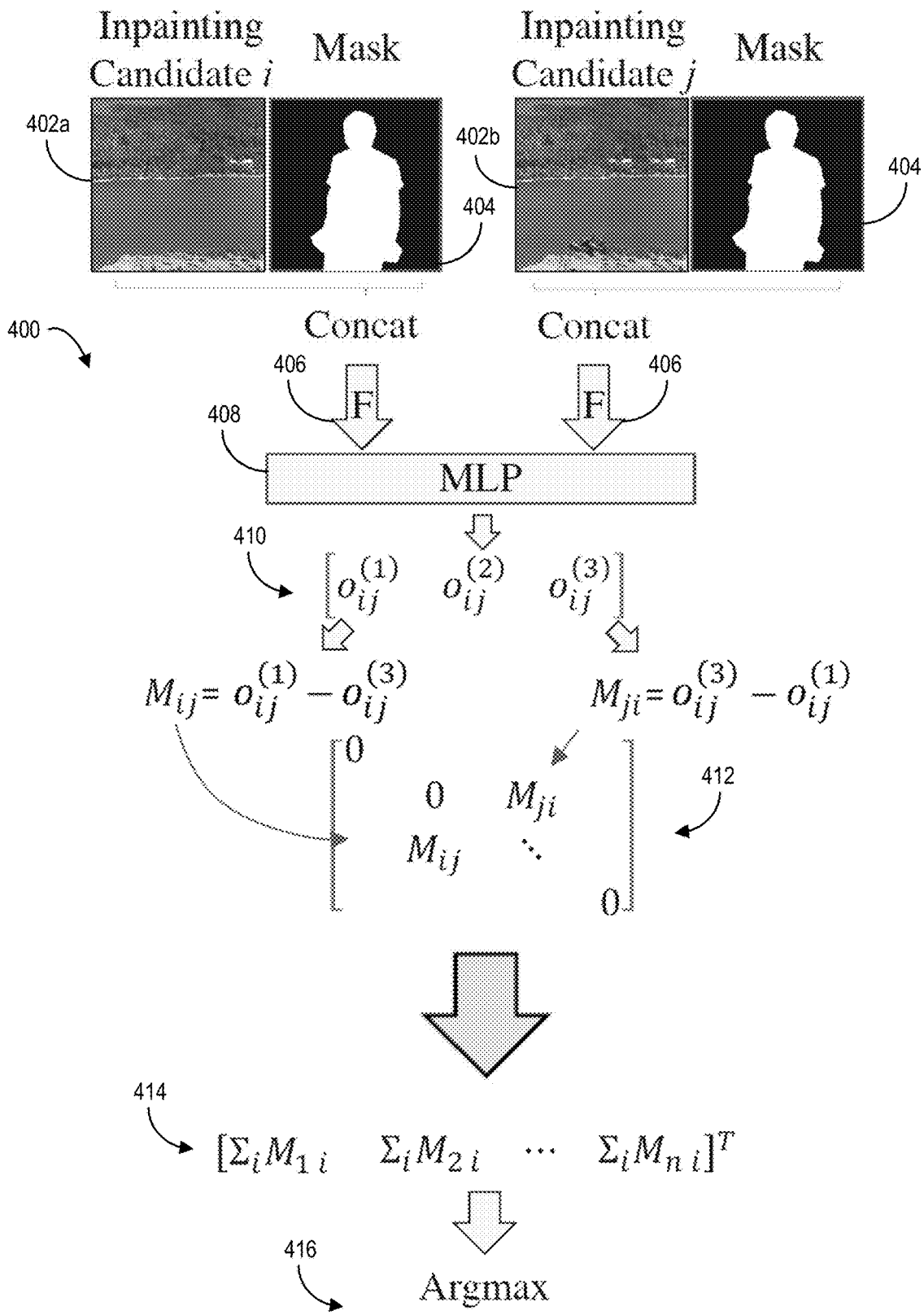
FIG. 4 illustrates a diagram for using an inpainting curation model to select a modified digital image from a plurality of modified digital images in accordance with one or more embodiments.

FIG. 4 illustrates a diagram for using an inpainting curation model 400 to select an inpainting result (e.g., a modified digital image) from a plurality of modified digital images in accordance with one or more embodiments.

As shown in FIG. 4, the guided inpainting curation system 106 utilizes the inpainting curation model 400 to select an inpainting result by analyzing image pairs from the plurality of modified digital images generated by a patch match model (e.g., the patch match model 314 discussed with reference to FIG. 3). Indeed, as shown in FIG. 4, the guided inpainting curation system 106 analyzes an image pair that includes a first modified digital image 402a (labeled as "inpainting candidate i") and a second modified digital image 402b (labeled as "inpainting candidate j") from the plurality of modified digital images generated by the patch match model.

As further shown in FIG. 4, the guided inpainting curation system 106 combines each of the first modified digital image 402a and the second modified digital image 402b with a mask 404 corresponding to the region of pixels to be replaced within the initial digital image (e.g., the digital image 302 discussed with reference to FIG. 3). For example, in some implementations, as indicated, the guided inpainting curation system 106 concatenates each of the first modified digital image 402a and the second modified digital image 402b with the mask 404.

In one or more embodiments, a mask includes an identification of a region of pixels within a digital image that are to be replaced or are being replaced. In particular, in some embodiments, a mask includes a partitioning of a digital image into separate portions. For example, in some implementations, a mask includes a filter that corresponds to a digital image that identifies a portion of the digital image (i.e., pixels of the digital image) belonging to one or more objects being removed from/replaced within the digital image. For instance, in some cases, a mask includes a segmentation mask used to remove an object from a digital image.

As further shown, the guided inpainting curation system 106 provides the resulting combinations to a first neural network 406 of the inpainting curation model 400. In one or more embodiments, the guided inpainting curation system 106 utilizes a convolutional neural network as the first neural network 406. In some implementations, the guided inpainting curation system 106 utilizes the neural network encoder described in U.S. patent application Ser. No. 17/589,114 filed on Jan. 31, 2022, entitled DETECTING DIGITAL OBJECTS AND GENERATING OBJECT MASKS ON DEVICE, the contents of which are expressly incorporated herein by reference in their entirety.

In one or more embodiments, the guided inpainting curation system 106 pretrains the first neural network 406 to classify, for a given image, whether it is a real image or a fake inpainted image. Indeed, the guided inpainting curation system 106 takes advantage of the correlation between initial pretrained network predictions and human perception of inpainting quality to learn good features over a large number of digital images. In some cases, to pretrain the first neural network 406, the guided inpainting curation system 106 creates a dataset having a number of diverse images that are at least at 2K resolution, generating a set of synthetic holes for each image, and then generating a set of modified digital images using a patch match model. As mentioned in some embodiments, the guided inpainting curation system 106 utilizes neural network encoder described in U.S. patent application Ser. No. 17/589,114. In some cases, the guided inpainting curation system 106 modifies the input of the neural network to take four input channels. In some cases, the guided inpainting curation system 106 trains the first neural network 406 utilizing a binary cross-entropy loss.

In one or more embodiments, the guided inpainting curation system 106 utilizes the first neural network 406 to generate a feature map from each combination. In particular, the guided inpainting curation system 106 generates a first feature map from the combination of the mask 404 and the first modified digital image 402a. Further, the guided inpainting curation system 106 generates a second feature map from the combination of the mask 404 and the second modified digital image 402b. In some implementations, the first neural network 406 utilizes a shared set of weights for generating the first and second feature maps. In some cases, the first neural network 406 includes multiple neural networks (e.g., one for generating each feature map) that utilize the same set of weights.

In one or more embodiments, a feature map includes a value or set of values representing one or more features of a digital image. In particular, in some embodiments, a feature map includes a map of values that represent patent and/or latent features of a digital image. For instance, in some cases, as suggested above, a feature map includes values representing features of a digital image based on (e.g., as informed by) a mask associated with the digital image. To illustrate, in some implementations, a feature map includes values corresponding to a region of pixels within a digital image that are to be or have been replaced (e.g., as informed by the mask associated with the digital image).

As illustrated in FIG. 4, the guided inpainting curation system 106 provides the outputs of the first neural network 406 (e.g., the first and second feature maps) to a second neural network 408 of the inpainting curation model 400. In one or more embodiments, the guided inpainting curation system 106 utilizes, as the second neural network 408, a multi-layer perceptron. For instance, in some cases, the guided inpainting curation system 106 utilizes a multi-layer perceptron that predicts three classes: prefer left image, tie, and prefer right image. In some implementations, the three classes correspond to human preference data.

Indeed, in one or more embodiments, the guided inpainting curation system 106 fine tunes the inpainting curation model 400 for a paired preference task. For instance, in some cases, the guided inpainting curation system 106 subsamples the dataset created for the first neural network 406 and compares sampled pairs of the patch match model outputs. The guided inpainting curation system 106 also collects human preferences for these pairs. In some cases, the guided inpainting curation system 106 further utilizes the first neural network 406 to featurize each image in a pair and utilizes the second neural network 408 to predict the three classes represented within the human data: prefer left image, tie, and prefer right image.

In some cases, to facilitate the prediction of an antisymmetric preference (where the same image is preferred despite the positioning of the images within the pair), the guided inpainting curation system 106 doubles each original batch to include a swapped copy of the batch. In some cases, inclusion of the swapped copies accelerates and stabilizes the training process. Thus, the guided inpainting curation system 106 fine-tunes the second neural network 408 and/or the first neural network 406 for the preference prediction task. In one or more embodiments, the guided inpainting curation system 106 utilizes antisymmetric matrices $M=-M^T$ (discussed more below) as the ground truths. For example, the guided inpainting curation system 106 generates a predicted antisymmetric matrix utilizing the first neural network 406 and the second neural network 408. The guided inpainting curation system 106 compares the predicted antisymmetric matrix with a ground truth antisymmetric matrix (e.g., populated based on measured preferences of actual reviewers), determines a measure of loss, and modifies parameters of the first neural network 406 and the second neural network 408 based on the measure of loss (e.g., via gradient descent and back-propagation processes).

As indicated by FIG. 4, the guided inpainting curation system 106 utilizes the second neural network 408 of the inpainting curation model 400 to generate a set of preference predictions for each image pair. For instance, as shown, the guided inpainting curation system 106 utilizes the second neural network 408 to generate a set of preference predictions 410 that includes a predicted preference for the first modified digital image 402a (e.g., $o_{ij}^{(1)}$) a predicted preference for the second modified digital image 402b (e.g., $o_{ij}^{(3)}$)), and a predicted tie (e.g., $o_{ij}^{(2)}$). In some cases, however, the guided inpainting curation system 106 trains and implements the second neural network 408 to generate two preference classes—prefer left image and prefer right image.

Further, as shown in FIG. 4, the guided inpainting curation system 106 utilizes the inpainting curation model 400 to determine a preference value for each modified digital image from an image pair using the set of predicted preferences. In one or more embodiments, a preference value includes a value indicating a preference for one modified digital image over another modified digital image. In particular, in some embodiments, the preference value includes a quantitative value indicating a probability of one modified digital image being preferred over another modified digital image.

For instance, in one or more embodiments, the guided inpainting curation system 106 utilizes the inpainting curation model 400 to determine a preference value $M_{ij}$ indicating a preference of the first modified digital image 402a (candidate i) over the second modified digital image 402b (candidate j). In particular, in some embodiments, the guided inpainting curation system 106 determines the preference value $M_{ij}=o_{ij}^{(1)}-o_{ij}^{(3)}$. Further, the guided inpainting curation system 106 utilizes the inpainting curation model 400 to determine a preference value $M_{ji}$ indicating a preference of the second modified digital image 402b over the first modified digital image 402a. In particular, in some cases, the guided inpainting curation system 106 determines the preference value $M_{ji}=-M_{ij}$.

Thus, in one or more embodiments, the guided inpainting curation system 106 determines preference values for each modified digital image from the plurality of modified digital images generated by the patch match model. Indeed, in some cases, the guided inpainting curation system 106 creates a plurality of image pairs by pairing each modified digital image with each of the other modified digital images, generates a set of predicted preferences for each image pair, and determines preference values using the sets of predicted preferences. In other words, the guided inpainting curation system 106 determines the set of preference values for all pairs i,j with i<j by setting $o_{ij}^{(k)}$ for k=1,2,3 as the three softmax outputs of the second neural network 408 and then compute $M_{ij}$ and $M_{ji}$. Accordingly, in some implementations, the guided inpainting curation system 106 determines a plurality of preference values for each modified digital image that indicate a preference of that modified digital image over the other modified digital images generated by the patch match model.

As further shown in FIG. 4, the guided inpainting curation system 106 utilizes the inpainting curation model 400 to generate an antisymmetric preference matrix 412 using the preference values determined for each modified digital image. In one or more embodiments, an antisymmetric preference matrix includes an antisymmetric matrix that corresponds to a set of modified digital images and is populated with their respective preference values. In particular, in some embodiments, an antisymmetric preference matrix includes an antisymmetric matrix where each row/column corresponds to a modified digital image from a plurality of modified digital image. Thus, a preference value within the antisymmetric preference matrix indicates a preference of the modified digital image associated with that row over the modified digital image associated with that column (or vice versa). Indeed, as indicated by FIG. 4, the antisymmetric preference matrix 412 includes an n×n matrix M.

Additionally, as shown in FIG. 4, the guided inpainting curation system 106 utilizes the inpainting curation model 400 to determine a preference score for each modified digital image represented by the antisymmetric preference matrix 412. In one or more embodiments, a preference score includes a quantitative measure of the quality of a modified digital image in the context of other modified digital images. In particular, in some embodiments, a preference score includes a quantitative value that indicates a preference of a modified digital image over other modified digital images. To illustrate, in some cases, a preference score for a modified digital image includes a combination of preference values that indicate preferences of the modified digital image over other modified digital images. Indeed, as indicated in FIG. 4, the guided inpainting curation system 106 determines a preference score for each modified digital image via column (or row) summation 414 of the preference values. In some implementations, the guided inpainting curation system 106 determines the preference score for each modified digital image by averaging the preference value in the column or row associated with that modified digital image.

Further, as illustrated by FIG. 4, the guided inpainting curation system 106 utilizes the inpainting curation model 400 to select a modified digital image from the plurality of modified digital images based on the determined preference scores. In particular, as shown, the guided inpainting curation system 106 selects the modified digital image having the highest preference score (e.g., via the Argmax function 416 or another function such as Argmin). Thus, in one or more embodiments, the guided inpainting curation system 106 utilizes the inpainting curation model 400 to select an inpainting result from a plurality of options generated via a patch match model.

The guided inpainting curation system 106 can utilize this method for various numbers of modified digital images. Indeed, as mentioned above, the guided inpainting curation system 106 generates various numbers of modified digital images using various deep visual guides in some embodiments. Accordingly, the guided inpainting curation system 106 utilizes the inpainting curation model 400 to generate an antisymmetric preference matrix populated with preference values for those modified digital images and selects an inpainting result based on resulting preference scores. Thus, the guided inpainting curation system 106 can flexibly adapt based on the number of modified digital images being generated.

In this manner, the guided inpainting curation system 106 offers improved flexibility when compared to conventional systems. Indeed, where conventional systems typically provide inpainting results based on the same inpainting approach regardless of the input, the guided inpainting curation system 106 flexibly provides an inpainting result that is optimal for the particular input. Indeed, by generating a plurality of modified digital images using a plurality of approaches (e.g., based on various combinations of deep visual guides) and selecting a modified digital image having the highest preference score, the guided inpainting curation system 106 provides an inpainting result generated from an approach that is optimal for a digital image.

Further, the guided inpainting curation system 106 offers improved accuracy. Indeed, by scoring and selecting a modified digital image from a set of modified digital images generated using various approaches the guided inpainting curation system 106 provides cohesive inpainting results that accurately reflect the contents of a digital image. For instance, the guided inpainting curation system 106 provides inpainting results that are preferred over other options. Further, by using the patch match model to generate the modified digital images, the guided inpainting curation system 106 provides inpainting results with higher resolution textures.

Although FIG. 4 illustrates a particular neural network architecture for selecting a digital image utilizing an inpainting curation model, the guided inpainting curation system 106 can utilize a variety of architectures. Indeed, the guided inpainting curation system 106 can utilize a variety of neural network architectures to create an (antisymmetric) preference representation (e.g., a matrix or other tensor) from two or more candidate images. The guided inpainting curation system 106 can utilize a variety of reduction operations (e.g., a sum, LSTM model, gated recurrent unit neural network, sequential neural network) on the preference representation to generate a probability/score/ranking and select a digital image.

Further, the previous discussion describes selecting from among modified digital images created using deep visual guides and a patch match model. It should be understood, however, that the guided inpainting curation system 106 operates without these features in some implementations. To illustrate, in some cases, the guided inpainting curation system 106 utilizes a deep inpainting neural network to generate a plurality of modified digital images. In particular, the guided inpainting curation system 106 can utilize the deep inpainting neural network to incorporate various sets of replacement pixels within the digital image to generate the modified digital images. Accordingly, in some cases, the guided inpainting curation system 106 utilizes the inpainting curation model to select from among the modified digital images created by the deep inpainting neural network.

Researchers has conducted studies to determine the accuracy of one or more embodiments of the guided inpainting curation system 106. FIGS. 5-9 provide qualitative and quantitative results regarding the effectiveness of the guided inpainting curation system 106 in accordance with one or more embodiments.

Figure 5:
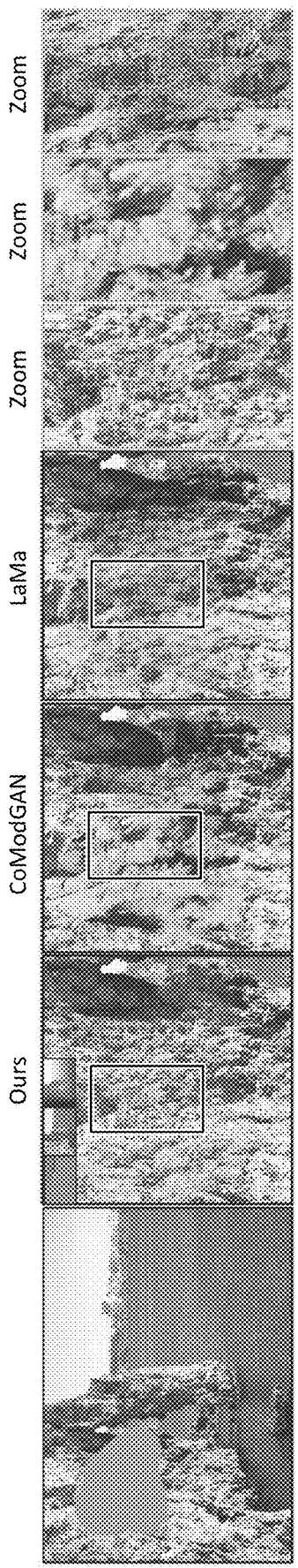
FIG. 5 illustrates graphical representations reflecting experimental results regarding the effectiveness of the guided inpainting curation system in accordance with one or more embodiments.

In particular, FIG. 5 illustrates graphical representations reflecting experimental results regarding the effectiveness of the guided inpainting curation system 106 in accordance with one or more embodiments. In particular, FIG. 5 compares the performance of an embodiment of the guided inpainting curation system 106 with the performance of the LaMa model described by Roman Suvorov et al. Further, FIG. 5 shows the performance of the co-modulated generative adversarial network (CoModGAN) described by S. Zhao et al., *Large Scale Image Completion via Co-modulated Generative Adversarial Networks*, International Conference on Learning Representations (ICLR), 2021.

FIG. 5 illustrates the input digital image with the corresponding region of pixels to be replaced. FIG. 5 further shows the inpainting result provided by each tested method as well as a zoom-in of the region that was replaced. As shown in FIG. 5, the experimental embodiment of the guided inpainting curation system 106 provides inpainting results that have a higher resolution when compared to the other tested methods.

FIG. 6 illustrates a table reflecting additional experimental results regarding the effectiveness of the guided inpainting curation system 106 in accordance with one or more embodiments. In particular, the table of FIG. 6 compares the performance of several embodiments of the guided inpainting curation system 106. For instance, the table includes an embodiment that includes all of the features described above (labeled "Our Curation Network"); and embodiment that skips the pretraining steps (labeled "Ours No Pretraining"); an embodiment that removes JPEG compression, rotation, and noise (labeled "Ours Fewer Augmentations"); an embodiment that does not input the mask corresponding to the region of pixels to be replaced (labeled "Ours No Mask"); an embodiment that modifies the pretraining to featurize both real and fake images with a shared-weight EfficientNet backbone and compare the feature maps with an additional MLP (labeled "Ours Late Fusion Variant"); an embodiment that concatenates both images of an image pair with the mask and provides the result to a single EfficientNet backbone followed by MLP (labeled "Ours Early Fusion"); and an embodiment that freezes the network weights of the first neural network of the inpainting curation model and only fine-tunes the MLP (labeled "Ours Freeze Backbone").

Additionally, the table compares the performance of the embodiments of the guided inpainting curation system 106 to human performance. Further, the table includes the performance of the neural image assessment (NIMA) model described by H. Talebi and P. Milanfar, *NIMA: Neural Image Assessment*, IEEE Transactions on Image Processing 27(8), 3998-4011, 2018 and the meta-learning based image quality assessment (MetaIQA) model described by H. Zhu et al., *MetaIQA: Deep Meta-learning for No-reference Image Quality Assessment*, Proceedings of the IEEE/CVF Conference on Computer Vision and Pattern Recognition, pp. 14143-14152, 2020. As indicated, the latter models use pre-trained, frozen no-reference image quality assessment backbones and fine-tune the MLP. Additionally, the performance of a model that predicts preference at random is shown.

The table of FIG. 6 compares the performance of the tested methods on a human preference dataset, such as the one described above with reference to FIG. 4. In addition to collected preferences among image pairs, the researchers collected whether a preference was strong or weak for a random subset of the images. Cases where the mean human preference for one image was determined to be strong were labeled as "easy cases."

As shown by FIG. 6, all tested embodiments of the guided inpainting curation system 106 perform better than the other tested models in both metrics. Further, the best performing embodiment of the guided inpainting curation system 106 performed only marginally worse than the human performance. Accordingly, FIG. 6 indicates that the guided inpainting curation system 106 can select optimal (e.g., more preferred) inpainting results with higher accuracy when compared to many existing systems.

FIG. 7 illustrates a table comparing the performance of an embodiment of the guided inpainting curation system 106 with the EdgeConnect model described by K. Nazeri et al., *EdgeConnect. Generative Image Inpainting with Adversarial Edge Learning*, arXiv preprint arXiv: 1901.00212, 2019; the Deepfill2 model described by J. Yu et al., *Free form Image Inpainting with Gated Convolution*, Proceedings of the IEEE/CVF International Conference on Computer Vision, pp. 4471-4480, 2019; the mutual encoder-decoder with feature equalizations (MEDFE) model described by H. Liu et al., *Rethinking Image Inpainting via a Mutual Encoder-decoder with Feature Equalizations*, arXiv preprint arXiv: 2007.06929, 2020; the HiFill model described by Z. Yi et al., *Contextual Residual Aggregation for Ultra High-resolution Image Inpainting*, Proceedings of the IEEE/CVF Conference on Computer Vision and Pattern Recognition, pp. 7508-7517, 2020; the CoModGAN model described above; the mask-aware dynamic filtering (MADF) model described by M. Zhu et al., *Image Inpainting by End-to-end Cascaded Refinement with Mask Awareness*, IEEE Transactions on Image Processing 30, 4855-4866, 2021; the ProFill model described by Y. Zeng et al., *High-resolution Image Inpainting with Iterative Confidence Feedback and Guided Upsampling*, European Conference on Computer Vision, pp. 1-17, Springer, 2020; and the LaMa model described above.

Notably, the HiFill model can operate on images up to 8K resolution, the LaMa model can generalize to resolutions up to around 2K, the ProFill model can operate for resolutions up to 1K, and the remaining existing systems can only operate on images of 512×512 resolution. To test the performance of each method for inpainting images of resolution 4K and above, the researchers increased the resolutions of all methods with limited output resolution back to the native image resolution via super-resolution using the enhanced super-resolution generative adversarial network (Real-ESR-GAN) model described by X. Wang et al., *Training Real-world Blind Super-resolution with Pure Synthetic Data*, Proceedings of the IEEE/CVF International Conference on Computer Vision, pp. 1905-11914, 2021.

The table of FIG. 7 compares the performance of each tested method using various metrics, including the learned perceptual image patch similarity (LPIPS), the frechet inception distance (FID), the paired inception discriminative score (P-IDS), the unpaired inception discriminative score (U-IDS). The table also provides comparisons in a "full" scenario that indicates a square crop region around the entire inpainted region was used, and a "patch" scenario that indicates ten smaller randomly sampled crop regions were used in which the crop regions were drawn at consistent position from locations where the patch center is a hole pixel. Further, the table provides the results in two users studies (one for each scenario) where each user was asked to evaluate a randomly sampled batch of images and pick the best image in each case.

As shown by FIG. 7, the guided inpainting curation system 106 outperforms all other tested methods with regards to all of the metrics shown. Notably, the guided inpainting curation system 106 significantly outperforms the other methods with available data for the patch scenario. This is due to the higher texture output of the guided inpainting curation system 106 at the finest resolutions as it copies relevant background patches via a patch match model. These textures facilitate provision of a coherent whole.

FIG. 8 illustrates a table that indicates the measured performance of different existing baseline methods that perform the initial inpainting. These baselines were followed up with the Real-ESRGAN model (labeled "SR") and the performances of these combinations were compared to the performances of incorporating the baselines into the framework of the guided inpainting curation system 106. As shown in FIG. 8, the guided inpainting curation system 106 framework outperformed the other methods, indicating that the guided inpainting curation system 106 is suitable when combined with a variety of deep inpainting baselines and achieves better user preference over the alternatives.

FIG. 9 illustrates a table that compares the guided inpainting curation system 106 to Photoshop's Content-Aware Fill (CAF)—which is uses the patch match model described in U.S. patent application Ser. No. 17/202,019—and a baseline that randomly picks from among the modified digital images with equal probability. Again, the guided inpainting curation system 106 significantly outperforms the other methods, showing that it is an improvement over a commercial baseline used by professionals to manipulate photos at modern camera resolutions.

Figure 10:
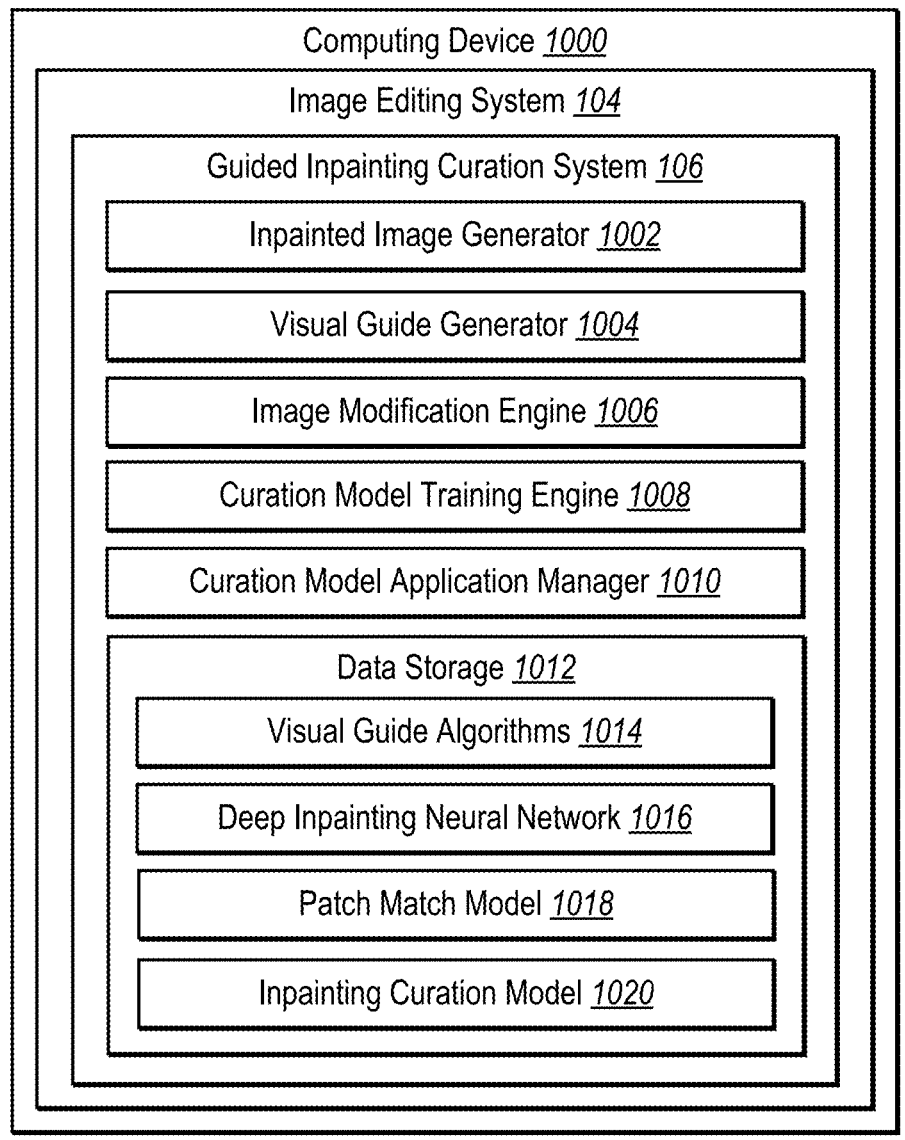
FIG. 10 illustrates an example schematic diagram of a guided inpainting curation system in accordance with one or more embodiments.

Turning now to FIG. 10, additional detail will now be provided regarding various components and capabilities of the guided inpainting curation system 106. In particular, FIG. 10 illustrates the guided inpainting curation system 106 implemented by the computing device 1000 (e.g., the server(s) 102 and/or one of the client devices 110*a*-110*n* discussed above with reference to FIG. 1). Additionally, the guided inpainting curation system 106 is also part of the image editing system 104. As shown in FIG. 10, the guided inpainting curation system 106 includes, but is not limited to, an inpainted image generator 1002, a visual guide generator 1004, an image modification engine 1006, a curation model training engine 1008, a curation model application manager 1010, and data storage 1012 (which includes visual guide algorithms 1014, a deep inpainting neural network 1016, a patch match model 1018, and an inpainting curation model 1020).

As just mentioned, and as illustrated in FIG. 10, the guided inpainting curation system 106 includes the inpainted image generator 1002. In one or more embodiments, the inpainted image generator 1002 generates inpainted digital images from digital images. For example, in some embodiments, the inpainted image generator 1002 generates an inpainted digital image by replacing a region of pixels within a digital image using a set of replacement pixels. In some cases, the inpainted image generator 1002 utilizes a deep inpainting neural network to generate inpainted digital images from digital images.

Additionally, as shown in FIG. 10, the guided inpainting curation system 106 includes the visual guide generator 1004. In one or more embodiments, the visual guide generator 1004 generates one or more deep visual guides to facilitate inpainting of a digital image having a region of pixels to replace. For instance, in some cases, the visual guide generator 1004 generates one or more deep visual guides utilizing one or more corresponding visual guide algorithms from an inpainted digital image. In some cases, the visual guide generator 1004 generates the one or more deep visual guides directly from the digital image having the region of pixels to replace.

Further, as shown in FIG. 10, the guided inpainting curation system 106 includes the image modification engine 1006. In one or more embodiments, the image modification engine 1006 generates modified digital images from digital images (e.g., modified digital images having a set of replacement pixels). For example, in some cases, the image modification engine 1006 utilizes a patch match model to generate a modified digital image from a digital image. In some implementations, the image modification engine 1006 generates a modified digital image based on one or more deep visual guides created for the digital image.

As shown in FIG. 10, the guided inpainting curation system 106 also includes the curation model training engine 1008. In one or more embodiments, the curation model training engine 1008 trains an inpainting curation model to select a modified digital image from a plurality of modified digital images. In particular, in some embodiments, the curation model training engine 1008 trains neural network components of the inpainting curation model. For instance, in some cases, the curation model training engine 1008 trains the inpainting curation model to predict preferences from among a set of modified digital images.

As shown in FIG. 10, the guided inpainting curation system 106 further includes the curation model application manager 1010. In some implementations, the curation model application manager 1010 implements an inpainting curation model to select inpainting results. For example, in some cases, the curation model application manager 1010 implements the inpainting curation model to select a modified digital image from among a plurality of modified digital images. In some instances, the curation model application manager 1010 utilizes the inpainting curation model to generate an antisymmetric matrix that includes preference values for each modified digital image, determine preference scores for the modified digital images based on their preference values, and select a modified digital image using the preference scores.

Additionally, as shown, the guided inpainting curation system 106 includes data storage 1012. In particular, data storage 1012 (implemented by one or more memory devices) includes visual guide algorithms 1014, the deep inpainting neural network 1016, the patch match model 1018, and the inpainting curation model 1020. In one or more embodiments, the visual guide algorithms 1014 stores the one or more visual guide algorithms used to create deep visual guides. In some cases, the deep inpainting neural network 1016 stores the deep inpainting neural network used to generate an inpainting digital image from a digital image. In some embodiments, the patch match model 1018 stores the patch match model used to generate modified digital images (e.g., based one or more deep visual guides). In some instances, the inpainting curation model 1020 stores the inpainting curation model used to select an inpainting result from a plurality of modified digital images.

Each of the components 1002-1020 of the guided inpainting curation system 106 can include software, hardware, or both. For example, the components 1002-1020 can include one or more instructions stored on a computer-readable storage medium and executable by processors of one or more computing devices, such as a client device or server device. When executed by the one or more processors, the computer-executable instructions of the image modification engine 1006 can cause the computing device(s) to perform the methods described herein. Alternatively, the components 1002-1020 can include hardware, such as a special-purpose processing device to perform a certain function or group of functions. Alternatively, the components 1002-1020 of the guided inpainting curation system 106 can include a combination of computer-executable instructions and hardware.

Furthermore, the components 1002-1020 of the guided inpainting curation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1020 of the guided inpainting curation system 106 may be implemented as a stand-alone application, such as a desktop or mobile application. Furthermore, the components 1002-1020 of the guided inpainting curation system 106 may be implemented as one or more web-based applications hosted on a remote server. Alternatively, or additionally, the components 1002-1020 of the guided inpainting curation system 106 may be implemented in a suite of mobile device applications or "apps." For example, in one or more embodiments, the guided inpainting curation system 106 can comprise or operate in connection with digital software applications such as ADOBE® PHOTOSHOP® or ADOBE® AFTER EFFECTS®. The foregoing are either registered trademarks or trademarks of Adobe Inc. in the United States and/or other countries.

Figure 11:
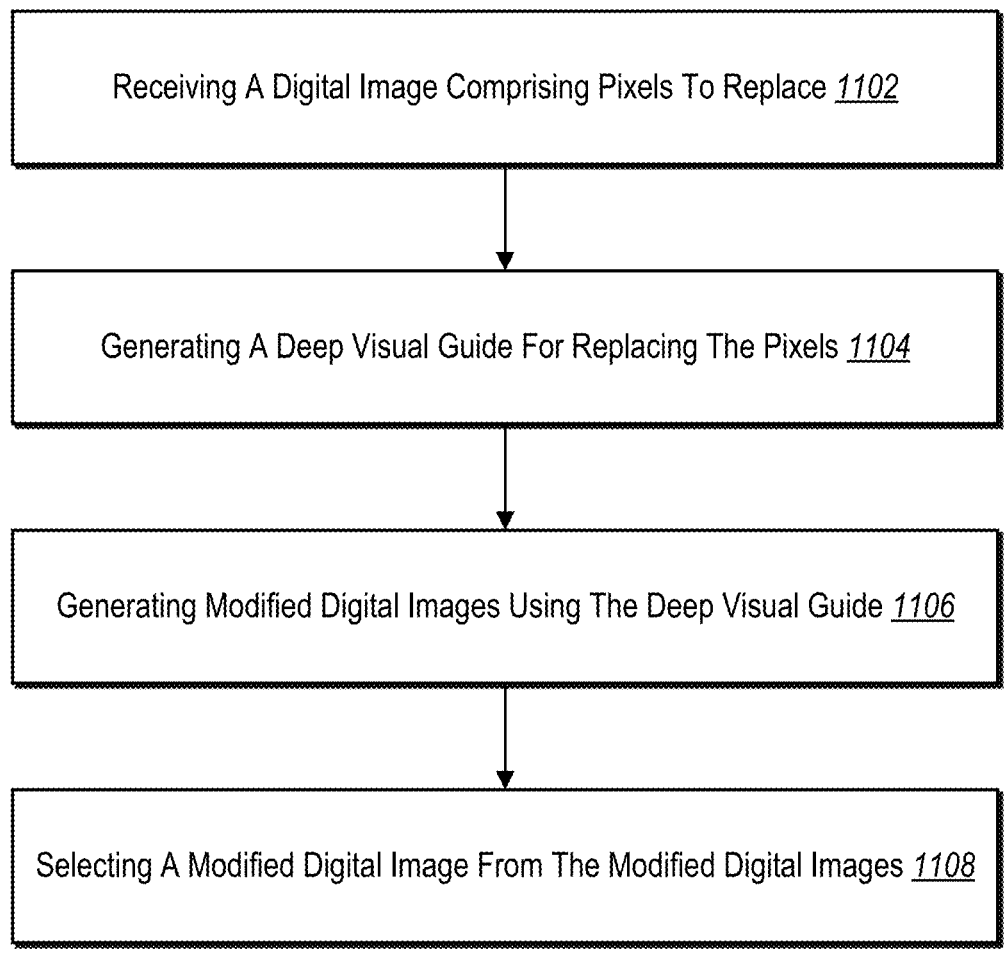
FIG. 11 illustrates a flowchart of a series of acts for generating a modified digital image that replaces a region of pixels within a digital image in accordance with one or more embodiments.

FIGS. 1-10, the corresponding text, and the examples provide a number of different methods, systems, devices, and non-transitory computer-readable media of the guided inpainting curation system 106. In addition to the foregoing, one or more embodiments can also be described in terms of flowcharts comprising acts for accomplishing the particular result, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

FIG. 11 illustrates a flowchart of a series of acts 1100 for generating a modified digital image that replaces a region of pixels within a digital image in accordance with one or more embodiments. FIG. 11 illustrates acts according to one embodiment, alternative embodiments may omit, add to, reorder, and/or modify any of the acts shown in FIG. 11. In some implementations, the acts of FIG. 11 are performed as part of a computer-implemented method. Alternatively, a non-transitory computer-readable medium can store instructions thereon that, when executed by at least one processor, cause the at least one processor to perform operations comprising the acts of FIG. 11. In some embodiments, a system performs the acts of FIG. 11. For example, in one or more embodiments, a system includes one or more memory devices. The system further includes one or more processors coupled to the one or more memory devices that cause the system to perform operations comprising the acts of FIG. 11.

The series of acts 1100 includes an act 1102 for receiving a digital image comprising pixels to replace. For example, in one or more embodiments, the act 1102 involves receiving, from a client device, a digital image comprising a region of pixels to replace.

Additionally, the series of acts 1100 includes an act 1104 for generating a deep visual guide for replacing the pixels. For instance, in some embodiments, the act 1104 involves generating, utilizing a visual guide algorithm, at least one deep visual guide for replacing the region of pixels of the digital image.

In one or more embodiments, generating the at least one deep visual guide comprises generating, utilizing a plurality of visual guide algorithms, a plurality of deep visual guides. For instance, in some cases, generating the plurality of deep visual guides comprises generating a first deep visual guide and a second deep visual guide.

As another example, in some cases, generating the at least one deep visual guide comprises generating at least two of a structure image guide, an image depth guide, or a segmentation image guide.

In some embodiments, the guided inpainting curation system 106 generates, from the digital image, an inpainted digital image by utilizing a deep inpainting neural network to replace the region of pixels of the digital image with an initial set of replacement pixels; and generates, utilizing the visual guide algorithm, the at least one deep visual guide from the inpainted digital image.

Further, the series of acts 1100 includes an act 1106 for generating modified digital images using the deep visual guide. To illustrate, in some embodiments, the act 1106 involves generating, utilizing a patch match model and the at least one deep visual guide, a plurality of modified digital images from the digital image by replacing the region of pixels of the digital image with replacement pixels.

In one or more embodiments, generating the plurality of modified digital images comprises generating, utilizing the patch match model and combinations of deep visual guides from the plurality of deep visual guides, the plurality of modified digital images. For instance, in some cases, generating the plurality of modified digital images comprises: generating a first modified digital image utilizing the first deep visual guide; generating a second modified digital image utilizing the second deep visual guide; and generating a third modified digital image utilizing a combination of the first deep visual guide and the second deep visual guide.

The series of acts 1100 includes an act 1108 for selecting a modified digital image from the modified digital images. For example, in some implementations, the act 1108 involves selecting, utilizing an inpainting curation model, a modified digital image from the plurality of modified digital images to provide to the client device.

For example, in one or more embodiments, the guided inpainting curation system 106 determines a plurality of image pairs from the plurality of modified digital images; and generates, utilizing the inpainting curation model, an antisymmetric preference matrix comprising preference values corresponding to the plurality of image pairs. In some cases, the guided inpainting curation system 106 generates the preference values corresponding to the plurality of image pairs by, for a given image pair comprising a first modified digital image and a second modified digital image: determining a first preference value indicating a preference of the first modified digital image over the second modified digital image; and determining a second preference value indicating a preference of the second modified digital image over the first modified digital image. In some implementations, the guided inpainting curation system 106 further determines, utilizing the inpainting curation model, preference scores for the plurality of modified digital images using the preference values of the antisymmetric preference matrix; and selects the modified digital image from the plurality of modified digital images to provide to the client device based on the preference scores for the plurality of modified digital images.

To provide an illustration, in one or more embodiments, the guided inpainting curation system 106 determines, utilizing a set of visual guide algorithms, deep visual guides for replacing a region of pixels of a digital image; generates, utilizing a patch match model, a plurality of modified digital images from the digital image by replacing the region of pixels of the digital image with replacement pixels based on the deep visual guides; generates, utilizing an inpainting curation model, an antisymmetric matrix comprising preference values corresponding to image pairs from the plurality of modified digital images; and determines, utilizing the inpainting curation model, a modified digital image for the digital image by selecting the modified digital image from the plurality of modified digital images using the preference values of the antisymmetric matrix.

In some cases, the guided inpainting curation system 106 generates, utilizing a first neural network of the inpainting curation model, feature maps for the plurality of modified digital images; and generates, utilizing a second neural network of the inpainting curation model, the preference values corresponding to the image pairs based on the feature maps. In some implementations, generating the feature maps for the plurality of modified digital images comprises generating a feature map for a modified digital image utilizing the first neural network from a combination of the modified digital image and a mask corresponding to the region of pixels of the digital image being replaced.

In some embodiments, the guided inpainting curation system 106 generates the preference values corresponding to the image pairs by, for an image pair comprising a first modified digital image and a second modified digital image: determining a first preference value indicating a preference of the first modified digital image over the second modified digital image; and determining a second preference value indicating a preference of the second modified digital image over the first modified digital image.

In some instances, selecting the modified digital image from the plurality of modified digital images using the preference values of the antisymmetric matrix comprises: determining a preference score for the modified digital image by combining a set of preference values from the antisymmetric matrix that correspond to the modified digital image; and selecting the modified digital image based on a comparison of the preference score for the modified digital image to preference scores of other modified digital images from the plurality of modified digital images.

In some implementations, generating the plurality of modified digital images from the digital image comprises: determining weighted combinations of the deep visual guides; and generating, utilizing the patch match model and the weighted combinations of the deep visual guides, the plurality of modified digital images from the digital image. Further, in some cases, determining the weighted combinations of the deep visual guides comprises, for a weighted combination: determining weights for a set of color channels associated with the digital image; and determining at least one additional weight for at least one deep visual guide.

To provide another illustration, in some embodiments, the guided inpainting curation system 106 receives, from a client device, a digital image comprising a region of pixels to replace; generates, utilizing a visual guide algorithm, at least one deep visual guide for replacing the region of pixels of the digital image; generates, utilizing a patch match model and the at least one deep visual guide, a plurality of modified digital images from the digital image by replacing the region of pixels of the digital image with replacement pixels; and selects, utilizing an inpainting curation model, a modified digital image from the plurality of modified digital images to provide to the client device.

In some cases, generating the at least one deep visual guide utilizing the visual guide algorithm comprises generating a plurality of deep visual guides utilizing at least two of a structure image model, an image depth neural network, or a segmentation image neural network. Further, in some embodiments, generating the plurality of deep visual guides comprises generating a first deep visual guide and a second deep visual guide, and generating the plurality of modified digital images comprises generating one or more modified digital images utilizing the first deep visual guide and the second deep visual guide.

In some implementations, the guided inpainting curation system 106 further determines a plurality of image pairs from the plurality of modified digital images by pairing each modified digital image from the plurality of modified digital images with one or more other modified digital images from the plurality of modified digital images; and generates, utilizing the inpainting curation model, an antisymmetric preference matrix comprising preference values corresponding to the plurality of image pairs. Additionally, in some cases, the guided inpainting curation system 106 generates the preference values corresponding to the plurality of image pairs by, for an image pair, generating one or more probabilities indicating a preferred modified digital image from the image pair.

To provide a further illustration, in one or more embodiments, the guided inpainting curation system 106 receives, from a client device, a digital image comprising a region of pixels to replace; generates a plurality of modified digital images from the digital image by replacing the region of pixels of the digital image with replacement pixels; and selects, utilizing an inpainting curation model, a modified digital image from the plurality of modified digital images to provide to the client device. Indeed, though much of the previous discussion describes selecting modified digital images created using deep visual guides, the guided inpainting curation system 106 operates without deep visual guides in some cases. For instance, in some embodiments, the guided inpainting curation system 106 utilizes a deep inpainting neural network to generate a plurality of modified digital images from a digital image. For example, the deep inpainting neural network can vary the set of replacement pixels used in replacing the pixels of the digital image so each modified digital image includes a different set of replacement pixels. Accordingly, in some implementations, the guided inpainting curation system 106 utilizes the inpainting curation model to select a modified digital image from a plurality of modified digital images created by the deep inpainting neural network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
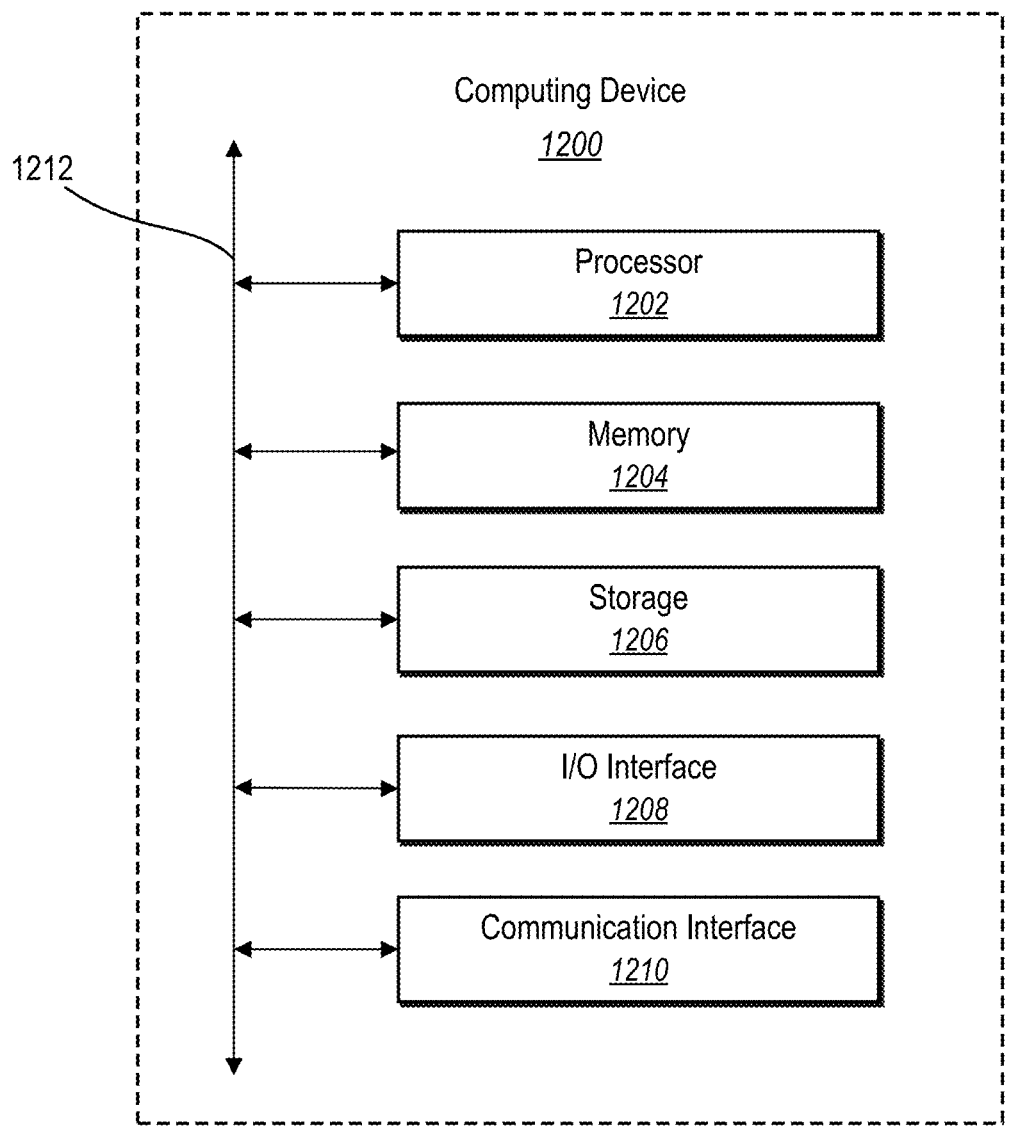
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102 and/or the client devices 110a-110n). In one or more embodiments, the computing device 1200 may be a mobile device (e.g., a mobile telephone, a smartphone, a PDA, a tablet, a laptop, a camera, a tracker, a watch, a wearable device). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 including storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, 110 interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to perform operations comprising:
   receiving, from a client device, a digital image comprising a region of pixels to replace;
   generating a plurality of modified digital images from the digital image by replacing the region of pixels of the digital image with replacement pixels; and
   selecting, utilizing an inpainting curation model, a modified digital image from the plurality of modified digital images to provide to the client device.

2. The non-transitory computer-readable medium of claim 1, wherein:
generating the plurality of modified digital images comprises generating a first modified digital image utilizing a first set of replacement pixels and generating a second modified digital image utilizing a second set of replacement pixels that differs from the first set of replacement pixels.

3. The non-transitory computer-readable medium of claim 1, further comprising instructions that, when executed by the at least one processor, cause the at least one processor to perform operations comprising generating a first deep visual guide and a second deep visual guide,
wherein generating the plurality of modified digital images comprises:
generating a first modified digital image utilizing the first deep visual guide;
generating a second modified digital image utilizing the second deep visual guide; and
generating a third modified digital image utilizing a combination of the first deep visual guide and the second deep visual guide.

4. The non-transitory computer-readable medium of claim 1, further comprising instructions that, when executed by the at least one processor, cause the at least one processor to perform operations comprising:
determining a plurality of image pairs from the plurality of modified digital images; and
generating, utilizing the inpainting curation model, an antisymmetric preference matrix comprising preference values corresponding to the plurality of image pairs.

5. The non-transitory computer-readable medium of claim 4, further comprising instructions that, when executed by the at least one processor, cause the at least one processor to perform operations comprising generating the preference values corresponding to the plurality of image pairs by, for a given image pair comprising a first modified digital image and a second modified digital image:
determining a first preference value indicating a preference of the first modified digital image over the second modified digital image; and
determining a second preference value indicating a preference of the second modified digital image over the first modified digital image.

6. The non-transitory computer-readable medium of claim 4, further comprising instructions that, when executed by the at least one processor, cause the at least one processor to perform operations comprising:
determining, utilizing the inpainting curation model, preference scores for the plurality of modified digital images using the preference values of the antisymmetric preference matrix; and
selecting the modified digital image from the plurality of modified digital images to provide to the client device based on the preference scores for the plurality of modified digital images.

7. The non-transitory computer-readable medium of claim 1, further comprising instructions that, when executed by the at least one processor, cause the at least one processor, to perform operations comprising:
generating, from the digital image, an inpainted digital image by utilizing a deep inpainting neural network to replace the region of pixels of the digital image with an initial set of replacement pixels;
generating, utilizing a visual guide algorithm, at least one deep visual guide from the inpainted digital image; and
generating the plurality of modified digital images utilizing the at least one deep visual guide.

8. The non-transitory computer-readable medium of claim 7, wherein generating the at least one deep visual guide comprises generating at least two of a structure image guide, an image depth guide, or a segmentation image guide.

9. A system comprising:
one or more memory devices; and
one or more processors coupled to the one or more memory devices that cause the system to perform operations comprising:
determining, utilizing a set of visual guide algorithms, deep visual guides for replacing a region of pixels of a digital image;
generating, utilizing a patch match model, a plurality of modified digital images from the digital image by replacing the region of pixels of the digital image with replacement pixels based on the deep visual guides;
generating, utilizing an inpainting curation model, an antisymmetric matrix comprising preference values corresponding to image pairs from the plurality of modified digital images; and
determining, utilizing the inpainting curation model, a modified digital image for the digital image by selecting the modified digital image from the plurality of modified digital images using the preference values of the antisymmetric matrix.

10. The system of claim 9, wherein the one or more processors are further configured to cause the system to perform operations comprising:
generating, utilizing a first neural network of the inpainting curation model, feature maps for the plurality of modified digital images; and
generating, utilizing a second neural network of the inpainting curation model, the preference values corresponding to the image pairs based on the feature maps.

11. The system of claim 10, wherein generating the feature maps for the plurality of modified digital images comprises generating a feature map for a modified digital image utilizing the first neural network from a combination of the modified digital image and a mask corresponding to the region of pixels of the digital image being replaced.

12. The system of claim 9, wherein the one or more processors are further configured to cause the system to perform operations comprising generating the preference values corresponding to the image pairs by, for an image pair comprising a first modified digital image and a second modified digital image:
determining a first preference value indicating a preference of the first modified digital image over the second modified digital image; and
determining a second preference value indicating a preference of the second modified digital image over the first modified digital image.

13. The system of claim 9, wherein selecting the modified digital image from the plurality of modified digital images using the preference values of the antisymmetric matrix comprises:
determining a preference score for the modified digital image by combining a set of preference values from the antisymmetric matrix that correspond to the modified digital image; and
selecting the modified digital image based on a comparison of the preference score for the modified digital image to preference scores of other modified digital images from the plurality of modified digital images.

14. The system of claim 9, wherein generating the plurality of modified digital images from the digital image comprises:
   determining weighted combinations of the deep visual guides; and
   generating, utilizing the patch match model and the weighted combinations of the deep visual guides, the plurality of modified digital images from the digital image.

15. The system of claim 14, wherein determining the weighted combinations of the deep visual guides comprises, for a weighted combination:
   determining weights for a set of color channels associated with the digital image; and
   determining at least one additional weight for at least one deep visual guide.

16. A computer-implemented method comprising:
   receiving, from a client device, a digital image comprising a region of pixels to replace;
   generating a plurality of modified digital images from the digital image by replacing the region of pixels of the digital image with replacement pixels; and
   selecting, utilizing an inpainting curation model, a modified digital image from the plurality of modified digital images to provide to the client device.

17. The computer-implemented method of claim 16, further comprising generating a plurality of deep visual guides utilizing at least two of a structure image model, an image depth neural network, or a segmentation image neural network.

18. The computer-implemented method of claim 17, wherein:
   generating the plurality of deep visual guides comprises generating a first deep visual guide and a second deep visual guide, and
   generating the plurality of modified digital images comprises generating one or more modified digital images utilizing the first deep visual guide and the second deep visual guide.

19. The computer-implemented method of claim 16, further comprising:
   determining a plurality of image pairs from the plurality of modified digital images by pairing each modified digital image from the plurality of modified digital images with one or more other modified digital images from the plurality of modified digital images; and
   generating, utilizing the inpainting curation model, an antisymmetric preference matrix comprising preference values corresponding to the plurality of image pairs.

20. The computer-implemented method of claim 19, further comprising generating the preference values corresponding to the plurality of image pairs by, for an image pair, generating one or more probabilities indicating a preferred modified digital image from the image pair.

* * * * *